United States Patent
Rajadurai et al.

(10) Patent No.: US 11,032,869 B2
(45) Date of Patent: Jun. 8, 2021

(54) METHOD OF SECURING UNICAST MESSAGE COMMUNICATION IN 3GPP BASED WIRELESS NETWORKS

(71) Applicant: Samsung Electronics Co., Ltd., Suwon-si (KR)

(72) Inventors: Rajavelsamy Rajadurai, Bangalore (IN); Mangesh Abhimanyu Ingale, Bangalore (IN); Narendranath Durga Tangudu, Bangalore (IN)

(73) Assignee: Samsung Electronics Co., Ltd., Seoul (KR)

( * ) Notice: Subject to any disclaimer, the term of this patent is extended or adjusted under 35 U.S.C. 154(b) by 0 days.

(21) Appl. No.: 16/742,123

(22) Filed: Jan. 14, 2020

(65) Prior Publication Data
US 2020/0229263 A1    Jul. 16, 2020

(30) Foreign Application Priority Data

Jan. 14, 2019   (IN) ............................ 201941001648
Jan. 10, 2020   (IN) ............................ 2019 41001648

(51) Int. Cl.
*H04W 12/00*    (2021.01)
*H04W 52/02*    (2009.01)
(Continued)

(52) U.S. Cl.
CPC ........... *H04W 76/27* (2018.02); *H04W 12/06* (2013.01); *H04W 12/12* (2013.01); *H04W 76/18* (2018.02)

(58) Field of Classification Search
None
See application file for complete search history.

(56) References Cited

U.S. PATENT DOCUMENTS

| 2018/0220486 A1* | 8/2018 | Tseng | H04W 76/27 |
| 2019/0014471 A1* | 1/2019 | Saily | H04W 12/04 |
| 2020/0084634 A1* | 3/2020 | Ohlsson | H04W 12/61 |

OTHER PUBLICATIONS

International Search Report dated May 1, 2020, issued in an International Application No. PCT/KR2020/000688.
(Continued)

*Primary Examiner* — Gary Lafontant
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method for securing unicast message communication is provided. The method includes sending, by a user equipment (UE), a request-message for resuming radio resource control (RRC) connection to a base station, wherein the request message comprises a first-parameter defining "resume cause". A response pertaining to at least one of network-release or network-resumption is received by the UE, wherein the response comprises a second parameter defining "resume cause". Based on a successful-mapping between the first parameter and the second parameter, the response is acknowledged by the UE. However, for example, in case of network-rejection of the request due to network congestion, an RRC reject message comprising a first message authentication code is computed by the base station based on a stored network security context and communicated to the UE. Thereafter, a second message authentication code is mapped by the UE with the first message authentication code.

15 Claims, 15 Drawing Sheets

(51) Int. Cl.
*H04W 76/27* (2018.01)
*H04W 12/12* (2021.01)
*H04W 12/06* (2021.01)
*H04W 76/18* (2018.01)

(56) References Cited

OTHER PUBLICATIONS

Ericsson; Cleanup of references to L1 specifications; 3GPP TSG-RAN2 Meeting #104; R2-1818840; Nov. 16, 2018; Spokane, Washington, USA.

Huawei, Hisilicon; Discussion on security during Resume reject in Inactive state in NR; 3GPP TSG SA WG3 (Security) Meeting #89; S3-173189; Dec. 1, 2017, Reno, USA.

Huawei, Hisilicon; Discussion on security during Resume reject in Inactive state in NR; 3GPP TSG SA WG3 (Security) Meeting #90; S3-180131; Jan. 26, 2018, Gothenburg, Sweden.

3GPP; TSG RAN; NR; RRC protocol specification (Release 15), 3GPP TS 38.331 V15.3.0, Sep. 26, 2018; pp. 126-127, 396-397.

3GPP TS 23.003 V16.1.0, "3rd Generation Partnership Project; Technical Specification Group Core Network and Terminals; Numbering, addressing and identification (Release 16)", Dec. 2019.

3GPP TS 24.501 V16.3.0, "3rd Generation Partnership Project; Technical Specification Group; Core Network and Terminals; Non-Access-Stratum (NAS) protocol for 5G System (5G); Stage 3 (Release 16)", Dec. 2019.

3GPP TS 33.501 V16.1.0, "3rd Generation Partnership Project; Technical Specification Group Services and System Aspects; Security architecture and procedures for 5G system (Release 16)", Dec. 2019.

3GPP TS 38.304 V15.6.0, "3rd Generation Partnership Project; Technical Specification Group Radio Access Network; NR; User Equipment (UE) procedures in Idle mode and RRC Inactive state(Release 15)", Dec. 2019.

3GPP TS 38.331 V15.8.0, "3rd Generation Partnership Project; Technical Specification Group Radio Access Network; NR; Radio Resource Control (RRC) protocol specification (Release 15)", Dec. 2019.

* cited by examiner

METHOD OF SECURING UNICAST MESSAGE COMMUNICATION IN 3GPP BASED WIRELESS NETWORKS

CROSS-REFERENCE TO RELATED APPLICATION(S)

This application is based on and claims priority under 35 U.S.C. § 119(a) of an Indian patent application number 201941001648, filed on Jan. 14, 2019, and of an Indian patent application number 201941001648, filed on Jan. 10, 2020, filed in the Indian Intellectual Property Office, the disclosure of which is incorporated by reference herein in its entirety.

BACKGROUND

1. Field

The disclosure relates to manipulation of radio resource control (RRC) signaling-message. More particularly, the disclosure relates to manipulation of RRC signaling-message on an air-interface.

2. Description of Related Art

To meet the demand for wireless data traffic having increased since deployment of 4th generation (4G) communication systems, efforts have been made to develop an improved 5$^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In 3$^{rd}$ generation partnership project (3GPP) wireless networks and more recently in long-term evolution (LTE) networks, one of the main functions of radio resource control (RRC) Protocol layer inter alia includes establishment or release of a RRC connection. Three basic networking states that a User Equipment (UE) can attain in establishment or release of the RRC connection procedures are 'RRC_IDLE', 'RRC_INACTIVE' and 'RRC_CONNECTED'. The 'RRC_IDLE' state indicates that signaling radio-bearer is not established i.e. no RRC connection is established. Here the UE performs neighboring cell measurements, cell selection or re-selection, collects measurement reports and acquires system-information. The 'RRC_CONNECTED' state indicates that signaling radio bearer is established i.e. RRC connection is established. In the 'RRC_CONNECTED' state, transfer of data to/from the UE takes place. In RRC_INACTIVE state, both the gNB and the UE save the UE context (bearer configuration and security context) even after the UE is released from the gNB. In the 'RRC_INACTIVE' state, the RRC Operations performed are, Broadcast of system information, Cell re-selection mobility, Paging is initiated by NG-RAN (RAN paging), RAN-based notification area (RNA) is managed by NG-RAN, DRX for RAN paging configured by NG-RAN, 5GC—NG-RAN connection (both C/U-planes) is established for UE, NG-RAN knows the RNA which the UE belongs to. The UE in RRC_INACTIVE state can move to RRC_CONNECTED or RRC_IDLE.

In a 5th generation (5G) system, the RRC_INACTIVE state allows gNB to suspend the UE's RRC connection while the gNB and the UE continue to maintain the UE 5G AS security context. The UE RRC connection can be resumed at a later time by allowing the UE to transition into RRC_CONNECTED state. The UE may transition from RRC_INACTIVE state to RRC_CONNECTED state to the same last serving gNB which sent the UE into RRC_INACTIVE state or to a different gNB. While, the UE is in RRC_INACTIVE state, the UE and a last serving gNB, store the UE 5G AS security context which can be reactivated, when the UE transitions from RRC_INACTIVE to RRC_CONNECTED [3GPP TS 33.501].

When the UE decides to resume the RRC connection to transit from RRC_INACTIVE to RRC_CONNECTED, the UE sends RRC Connection Resume Request message on SRB0 and hence it is not integrity protected. The RRC Connection Resume Request message shall include the I-RNTI and an InactiveMAC-I. The I-RNTI (short or full I-RNTI) is used for context identification and its value shall be the same as the I-RNTI that the UE had received from the source gNB in the RRC Connection Inactive message. The InactiveMAC-I is a 16-bit message authentication token [TS 33.501]. When the target gNB receives the RRC Connection Resume Request message from the UE, the target gNB extracts the I-RNTI from the RRC Connection Resume Request message. The target gNB contacts the source gNB, based on the information in the I-RNTI, by sending an Xn-AP Retrieve UE Context Request message with the following included: I-RNTI, the InactiveMAC-I and target Cell-ID, in order to allow the source gNB to validate the UE request and to retrieve the UE context including the UE 5G AS security context [TS 33.501]. In scenarios where the source and the target are same, then the procedure defined for source and target gNBs are performed by a gNB.

In current scenario, the resume cause is not protected in the RRC resume request message. There is a possibility that an attacker may capture the RRC resume request message and alter a resume cause value. Then the altered message is sent to the gNB by the attacker. As a result, instead of sending the RRC Resume message to bring back the UE to 'RRC_CONNECTED' state (based on the resume cause from the genuine UE), the gNB may send the RRC Reject message to put the UE on hold or the gNB may send the RRC Release message to push the UE to the 'RRC_IDLE' state (based on the modified resume cause from the attacker).

For example, an attacker can capture the RRC Resume Request with Resume cause "highPriorityAccess" and change it to resume cause "RNA Update" and send it to target gNB. In this case, instead of sending the RRCResume message (to bring back the UE to RRC_CONNECTED state for the resume cause "highPriorityAccess"), the gNB may send the RRCRelease message to put the UE back to RRC Inactive state. This in turn causes denial-of-service (DoS) on the UE requesting high priority access during RRC connection re-establishment.

In another example, an attacker captures the RRC Resume Request message with the resume cause value as "RNAUpdate" and changes the resume cause value to "mo-data" before sending to the gNB and this modified message reaches the gNB. In this example, the gNB resumes the UE RRC connection with either the RRC resume message or RRC setup message depending on success or failure of the UE context retrieval. While this does not cause a denial-of-service for the UE requesting "RNAUpdate", however the same cause unnecessary overhead at the air interface as the UE transit to RRC_CONNECTED state. In an example, the resume cause provided by the UE to the gNB may be used in Self Organizing Network (SON) algorithms. In another example, the resume cause provided by the UE to the gNB may be used in network-implementation specific algorithms on the NW side for network-optimizations and statistics. Therefore, manipulation of the "resume-cause" suppresses working of SON algorithms optimally and causes NW performance degradation.

Overall, there is absence of mechanism to ensure the authenticity of the RRCReject message i.e. an authentication that RRCReject message is from the genuine gNB and the contents in the RRCReject message are not modified.

Further, "Resumecause" is not protected in the "RRCResumeRequest message". Thus, an attacker may capture the RRC Resume Request with Resumecause "highPriorityAccess" and change it to resumecause "RNA Update" and send it to target gNB. In this case, instead of sending the RRCResume message (to bring back the UE to RRC Connected state for the resume cause "highPriorityAccess"), the gNB may send the RRCRelease message to put the UE back to RRC Inactive state. This may cause a denial of service on a UE requesting an emergency call during RRC Resume procedure.

In the current specified procedures (e.g. 3GPP Release-15), there is no mechanism defined to identify whether the Resume Cause transmitted by the UE is not modified/altered on the air interface, either by the UE or by the gNB and also there is no mechanism for the UE to verify the authenticity of the RRC Reject message, specifically when Reject message is received in response to Resume Request message.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of securing unicast message communication in 3GPP based wireless networks. Embodiments are described in terms related to the specification of 3gpp, but this is merely illustrative and is not necessarily limited thereto.

Another aspect of the disclosure is to provide to introduce a selection of concepts in a simplified format that are further described in the detailed description of the disclosure.

Additional aspects will be set forth in part in the description which follows and, in part, will be apparent from the description, or may be learned by practice of the presented embodiments.

In accordance with an aspect of the disclosure, a method of securing unicast message communication in 3rd generation partnership project (3GPP) based wireless networks is provided. The method includes sending, by a User Equipment (UE), a request-message for resuming radio resource control (RRC) connection to a base station. In case of network-rejection to the request, for example, in case of network congestion, an RRC reject message comprising a first message authentication code is computed by the base station based on a stored network-security context. The RRC reject message is communicated from the base-station to the UE. Thereafter, a second message authentication code is mapped by the UE with the first message authentication code, the second code having been computed by the UE based on the stored network security context. Based on a successful mapping, the RRC reject message is acknowledged by the UE.

In accordance with another aspect of the disclosure, a method of securing unicast message communication in 3GPP based wireless networks is provided. The method includes sending, by a UE, a request-message for resuming RRC connection to a base station, wherein the request message comprises a first-parameter defining "resume cause". Thereafter, the message comprises receiving by the UE from the base station a response pertaining at least one of network-release or network resumption, wherein the response comprises a second parameter defining "resume cause". The first parameter present within the request message is mapped by the UE with the second parameter present within the response. Based on a successful-mapping, the response from the base-station is acknowledged by the UE.

Other aspects, advantages and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings in which.

The same reference numerals are used to represent the same elements throughout the drawings.

Figure 1:
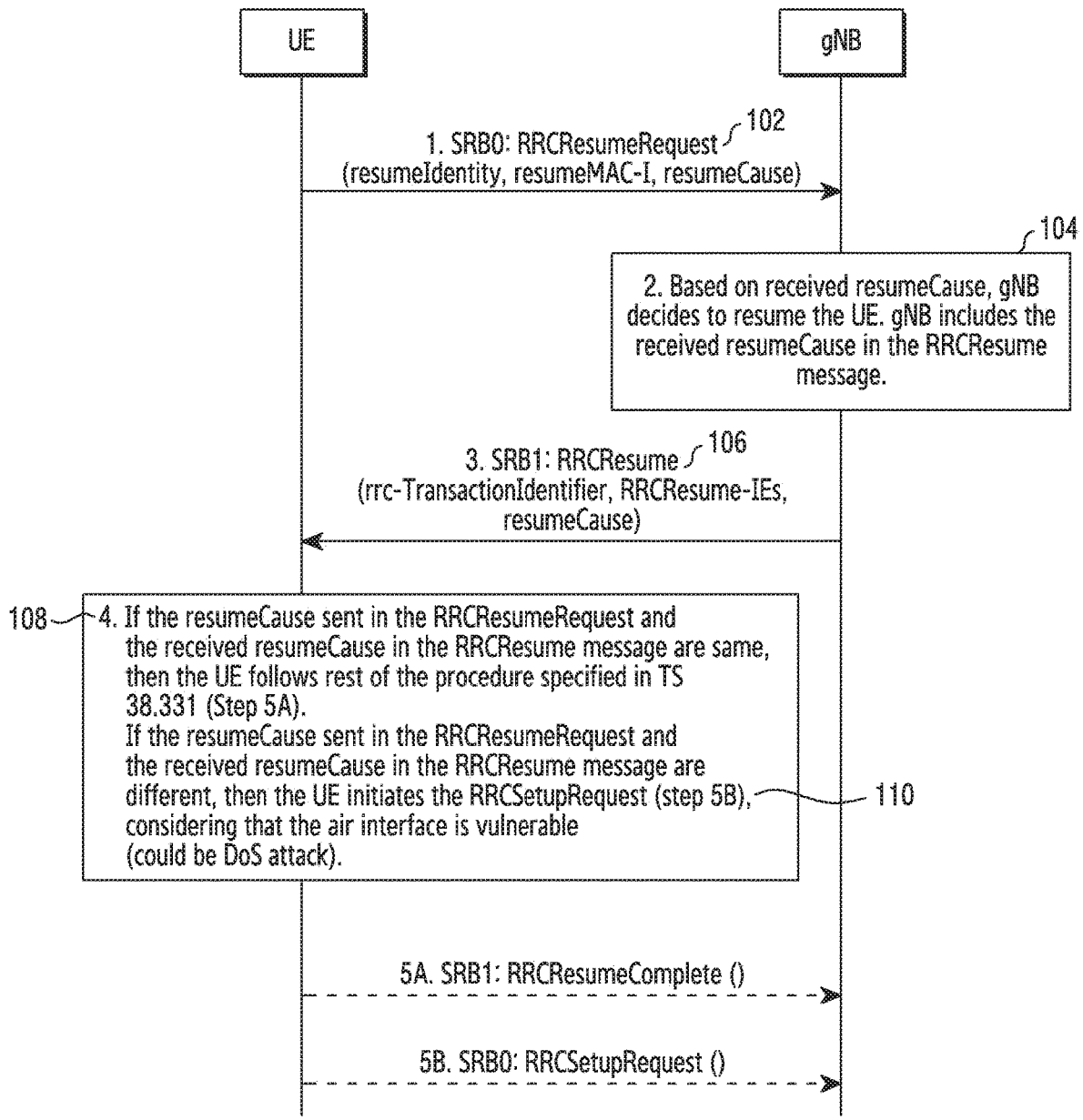
FIG. 1 illustrates a flowchart for a method of User Equipment (UE) identifying whether a Resume Cause is modified/altered and then performs a fallback to establish a new radio resource control (RRC) connection or remains in RRC Inactive state, when the UE receives a RRC Resume message, according to an embodiment of the disclosure.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of the disclosure. Furthermore, in terms of the construction of the device, one or more components of the device may have been represented in the drawings by symbols of the related art, and the drawings may show only those specific details that are pertinent to understanding the embodiments of the disclosure so as not to obscure the drawings with details that will be readily apparent to those of ordinary skill in the art having benefit of the description herein.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Embodiments of the disclosure will be described below in detail with reference to the accompanying drawings.

The term "Source gNB", "last serving gNB" and "anchor gNB" are used interchangeably throughout the present disclosure. "Source gNB" means the gNB which moved the User Equipment (UE) to the radio resource control (RRC) INACTIVE state (gNB issued the RRCRelease with Suspend Configuration).

The term "Target gNB", "current serving gNB" and "serving gNB" are used interchangeably and means the gNB that receives the RRCResumeRequest message from the UE. In some scenarios, the "Target gNB" can be "Source gNB". If the "Target gNB" is not the "Source gNB", then the target gNB contacts the source gNB (based on the information in the I-RNTI) by sending an Xn-AP Retrieve UE Context Request message with the following included: I-RNTI, the InactiveMAC-I and target Cell-ID, in order to allow the source gNB to validate the UE request and to retrieve the UE context including the UE 5G AS security context.

The term "InactiveMAC-I", "resume Message Authentication Code for Integrity/authenticity verification (MAC-I)", "resume Message Authentication Code for Integrity/authenticity verification (resumeMAC-I)" and "resume-MAC-I" means the same and used interchangeably throughout the document.

The message name "RRCResumeRequest" means "RRCResumeRequest" or "RRCResumeRequest1" message in the present disclosure. Further, throughout the present disclosure the term "protected" means integrity protected and/or Confidentiality protected (encrypted).

Furthermore, throughout the present disclosure, the terms "resume cause", "resumeCause", "resumecause", "Resume-Cause", "Resumecause" means the same and used interchangeably.

The disclosure discloses a method and a system for verifying whether a resume cause transmitted by a UE, is manipulated such as modified or altered, on an air interface by a rogue UE. In accordance with the disclosure, in a scenario where the UE identifies that the resume cause has been manipulated, then the UE performs a fallback to establish a new RRC connection or remains in 'RRC_IDLE' state, based on the transmitted resume cause.

TABLE 1 illustrates various UE actions based on the resume cause.

RRC Inactive state, when the UE receives a RRC Resume message, according to an embodiment of the disclosure.

Referring to FIG. 1, the same illustrates a flowchart for a method of UE identifying whether the Resume Cause is modified/altered and then the UE performs a fallback to establish a new RRC connection or remains in RRC Inactive state, when the UE receives RRC Resume message, in accordance with an embodiment of the disclosure.

In a scenario that as has been depicted with respect to FIG. 1, at operation 102, the UE transmits a RRC resume request message to the gNB. The RRC resume request message includes a 'resume Identity', a 'resume Message Authentication Code' for authenticity (resumeMAC-I), a 'resume cause' and other possible parameters. The RRC resume request message essentially corresponds to a request-message for resuming RRC connection to a base station and comprises a first parameter defining the defining "resume cause".

At operation 104, based on the received resume cause, the gNB decides to resume the UE (gNB decides to move the UE to the RRC_CONNECTED state). The gNB includes the "resume cause" as a second parameter in a RRC resume message.

At operation 106, the RRC resume message is sent to the UE from the gNB. The RRC resume message includes 'rrc-Transaction identifier', RRC Resume-IEs, other possible parameters and the 'resume cause'. Specifically, the

TABLE 1

| Resume Cause in RRCResumeRequest | Expected message from the network | Received message from the network | UE action |
|---|---|---|---|
| emergency | RRCResume (emergency) or RRC Setup (emergency) | Other than expected message like, RRCRelease (any other ResumeCause) or RRCReject (any other ResumeCause) | Performs a fallback to establish a new RRC connection |
| rna-Update | RRCSetup (rna-Update) or RRCRelease (rna-Update with suspendConfig) or RRCReject (rna-Update with wait timer) or RRCRelease (without suspendConfig) | RRCResume (any other ResumeCause) or RRC Setup (any other cause) | In case of RRCResume (any other ResumeCause) or RRCRelease (any other ResumeCause), performs a fallback to establish a new RRC connection. In case of RRCRelease (with Suspend Config, any other ResumeCause) will remains in RRC_Inactive state |
| mo-Data | RRCSetup (mo-Data) or RRCResume (mo-Data) or RRCReject (mo-Data with wait timer) | RRCRelease (with or without suspendConfig any other ResumeCause) or RRCReject (any other ResumeCause) | Performs a fallback to establish a new RRC connection |

The above table is not limited only to the listed resume cause (or resumeCause or resumecause) values, it is applicable to other resume cause values (for example, 16 values) like, emergency, highPriorityAccess, mt-Access, mo-Signaling, mo-Data, mo-VoiceCall, mo-VideoCall, mo-SMS, ma-Update, mps-PriorityAccess, mcs-PriorityAccess.

FIG. 1 illustrates a flowchart for a method of User Equipment (UE) identifying whether a Resume Cause is modified/altered and then performs a fallback to establish a new radio resource control (RRC) connection or remains in operation corresponds to receiving at the UE from the base station a response pertaining to at-least one of network-release or network resumption, the response comprising a second parameter defining "resume-cause".

At operation 108, the first parameter of the request message is mapped by the UE with the second parameter present within the response. In case, the resume cause sent in the RRC resume request message and the resume cause in the RRC resume message are same, at operation 108, the UE follows rest of the RRC procedure as specified in 3GPP, TS 38.331. Accordingly, the response from the base-station is acknowledged by the UE based on a successful-mapping.

However, in case of unsuccessful mapping, i.e. in case the resume cause sent in the RRC resume request message and the resume cause in the RRC resume message are different, at operation 110, the UE sends a RRC setup-request to the gNB, considering that the air-interface is vulnerable from possible DoS attack. More specifically, the UE suspects network-attack connected with denial of service (DoS). Accordingly, the UE sends in a network-set up request for establishing a new RRC connection based on a count of number of unsuccessful-mappings exceeding a threshold. Optionally, the UE reports vulnerability in the air-interface during sending the network set-up request. The denial of service may be defined as vulnerability of the air interface during sending the network-set up request to the gNodeB, the vulnerability defined by alteration of the request message from UE to the gNodeB and thereby directed to deny an intended service requested by the UE from the gNodeB.

In an another embodiment with respect to operation 110, in case the resume cause sent in the RRC resume request message and the resume cause in the RRC resume message are different, at operation 110, the UE send a RRC Resume Complete message to transit to RRC_CONNECTED state, and optionally include the indicator indicating vulnerability of air interface and/or report (information) on manipulation of the "resume cause" on the air-interface (information like, intended resume cause, PCI of the cell, like so).

In the above discussed scenarios, the UE access stratum performs following operations, when the "resume cause" value received in RRCResume message is different than the resume cause value transmitted in RRCResumeRequest message and if the UE decides to send a RRC setup request to the gNB and/or receives RRC connection setup request from higher layers (for example, NAS):

1> stop timer T380, if running;
1> stop timer T390, if running;
1> reset MAC;
1> if T302 is running:
2> stop timer T302;
1> stop all timers that are running except T320 and T325;
1> discard the UE Inactive AS context;
1> set the variable pendingRnaUpdate to 'FALSE', if that is set to 'TRUE';
1> discard the $K_{gNB}$, the $K_{RRCenc}$ key, the $K_{RRCint}$, the $K_{UPint}$ key and the $K_{UPenc}$ key, if any;
1> release all radio resources, including release of the RLC entity, the MAC configuration and the associated PDCP entity and SDAP for all established RBs;
1> indicate the release of the RRC connection to upper layers together with the release cause i.e. securityReasons;
1> enter RRC_IDLE and perform cell selection as specified in TS 38.304

In the above discussed scenarios, the UE Non access stratum (NAS) will perform following operations, in response to the reception of the release cause 'securityReasons': UE NAS will enter 'EMM_IDLE' and trigger lower layer for the RRC connection setup request.

Figure 2:
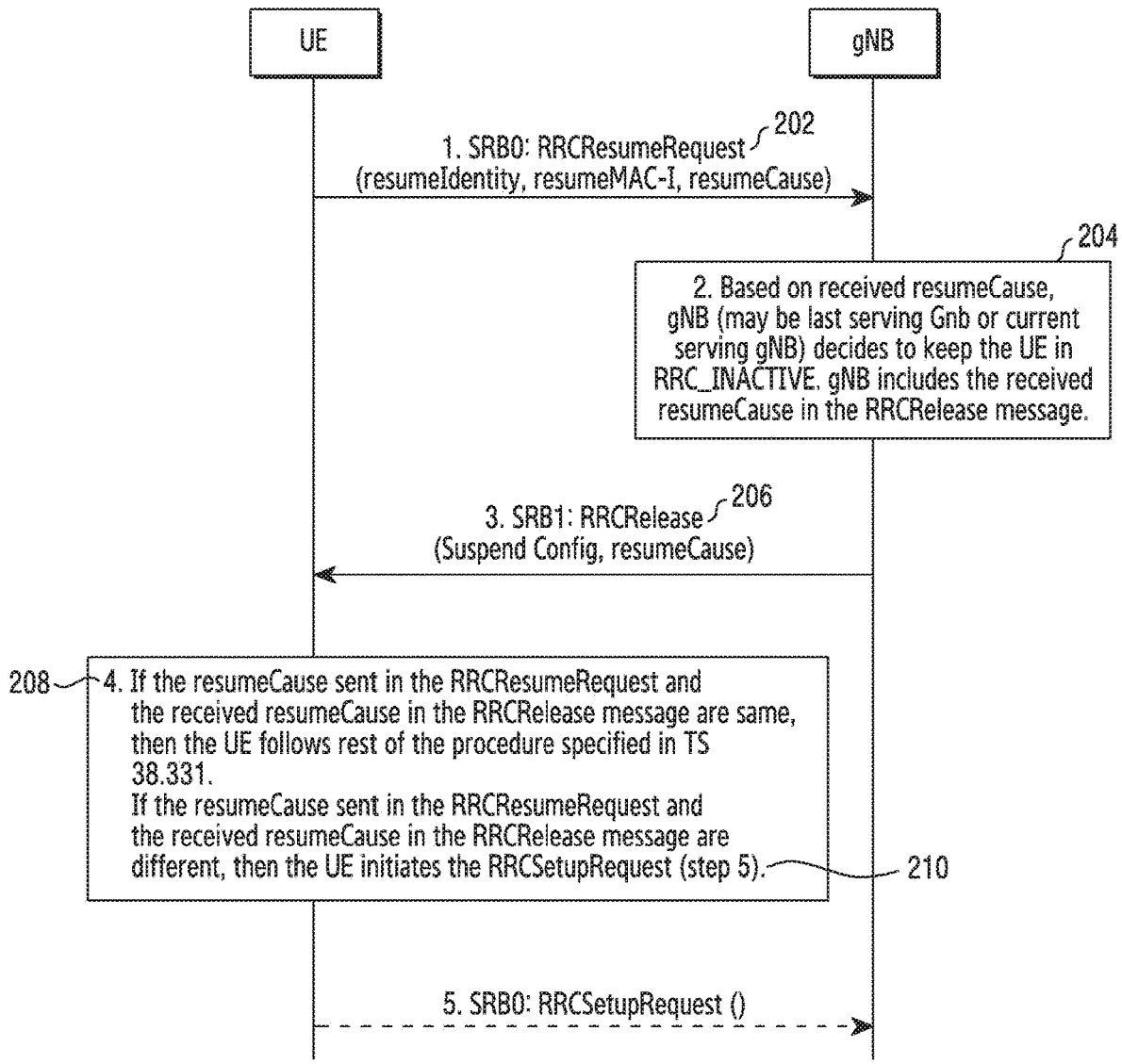
FIG. 2 illustrates a flowchart for a method of UE identifying whether a Resume Cause is modified/altered and then performs a fallback to establish a new RRC connection or remains in RRC Inactive state, when the UE receives RRC Release message according to an embodiment of the disclosure.

FIG. 2 illustrates a flowchart for a method of UE identifying whether a Resume Cause is modified/altered and then performs a fallback to establish a new RRC connection or remains in RRC Inactive state, when the UE receives a RRC Release message according to an embodiment of the disclosure.

Referring to FIG. 2, at operation 202, the UE transmits a RRC resume request message to the gNB. The RRC resume request message includes a 'resume Identity', a 'resume Message Authentication Code for Integrity/authenticity verification (resumeMAC-I)', a 'resume cause' and other possible parameters. The RRC resume request message essentially corresponds to a request-message for resuming RRC connection to a base station and comprises a first parameter defining the defining "resume cause".

At operation 204, based on the received resume cause, the gNB decides to keep the UE in 'RRC_INACTIVE' state. In this scenario, gNB may be a last serving gNB or a current serving gNB. The gNB includes the 'resume cause' as a second parameter in a RRC release message.

At operation 206, the RRC release message is sent to the UE from the gNB. The RRC release message includes a 'Suspend Config' and the 'resume cause'. In case, the resume cause sent in the RRC resume request message and the resume cause in the RRC release message are same, at operation 208, the UE follows RRC procedure as specified in 3GPP, TS 38.331.

However, in case the resume cause sent in the RRC resume request message and the resume cause in the RRC release message are different, at operation 210, the UE sends a RRC setup request to the gNB based on the "resume-cause" sent in the RRC resume request message and received message, considering that the air interface is vulnerable from possible DoS attack. In other words, if the resume cause sent in the RRC resume request message and the resume cause in the RRC release message are different, at operation 210, the UE initiates the procedure to transit to RRC_CONNECTED state instead of being in RRC_INACTIVE state.

More specifically, the UE suspects network-attack connected with denial of service (DoS). Further, the UE may send a network-set up request for establishing a new RRC connection based on a count of number of unsuccessful-mappings exceeding a threshold. Optionally, the UE reports vulnerability in the air-interface during sending the network set-up request.

In the above discussed scenarios, the UE access stratum will perform following operations, when the resume cause value received is different than the resume cause value transmitted in RRCResumeRequest message and if the UE decides to send a RRC setup request to the gNB and/or receives RRC connection setup request from higher layers (for example, NAS):

1> stop timer T380, if running;
1> stop timer T390, if running;
1> reset MAC;
1> if T302 is running:
2> stop timer T302;
1> stop all timers that are running except T320 and T325;
1> discard the UE Inactive AS context;
1> set the variable pendingRnaUpdate to 'FALSE', if that is set to 'TRUE';
1> discard the $K_{gNB}$, the $K_{RRCenc}$ key, the $K_{RRCint}$, the $K_{UPint}$ key and the $K_{UPenc}$ key, if any;
1> release all radio resources, including release of the RLC entity, the MAC configuration and the associated PDCP entity and SDAP for all established RBs;
1> indicate the release of the RRC connection to upper layers together with the release cause i.e. securityReasons;
1> enter RRC_IDLE and perform cell selection as specified in TS 38.304

In the above discussed scenarios, the UE Non access stratum (NAS) will perform following operations, in response to the reception of the release cause 'securityReasons': UE NAS will enter 'EMM_IDLE' and trigger lower layer for the RRC connection setup request.

Figure 3:
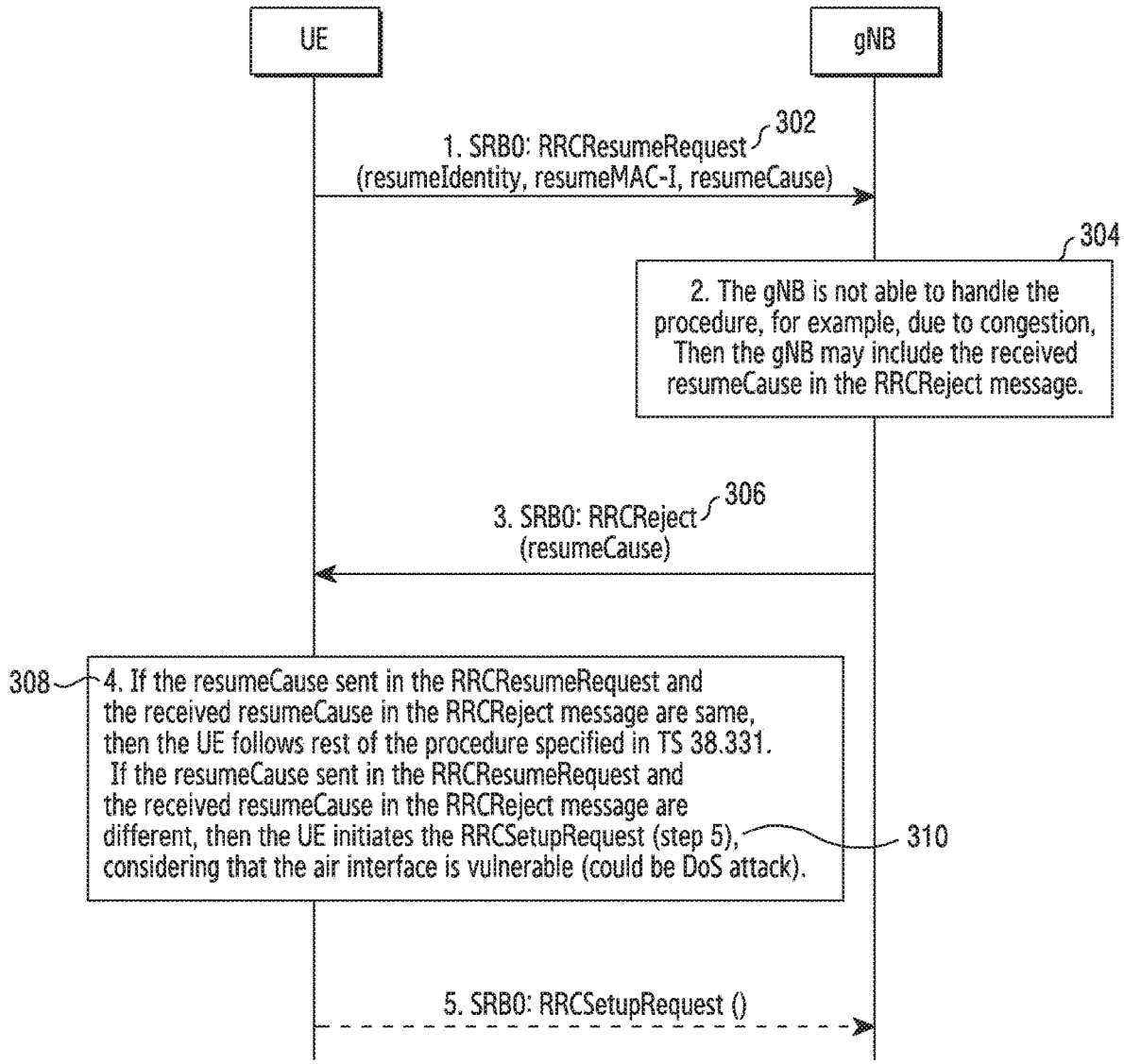
FIG. 3 illustrates a flowchart for a method of UE identifying whether a Resume Cause is modified/altered and then performs a fallback to establish a new RRC connection or remains in RRC Inactive state, when the UE receives RRC Reject message according to an embodiment of the disclosure.

FIG. 3 illustrates a flowchart for a method of UE identifying whether the Resume Cause is modified/altered and then the UE performs a fallback to establish a new RRC connection or remains in RRC Inactive state, when the UE receives RRC Reject message according to an embodiment of the disclosure.

Referring to FIG. 3, at operation 302, the UE transmits a RRC resume request message to the gNB or the base-station. The RRC resume request message includes a 'resume Identity', a 'resume Message Authentication Code for Integrity/ authenticity verification (resumeMAC-I)' and a 'resume cause'.

At operation 304, the gNB includes the received resume cause in a RRC reject message, along with other possible parameters. In this scenario, the gNB is not able to handle the procedure, for example, due to congestion.

At operation 306, the RRC reject message is sent to the UE from the gNB. The RRC reject message includes the 'resume cause' along with other possible parameters. More specifically, in case of network rejects the request, an RRC reject message is received by the UE from the base station.

At operation 308, it is observed if the "resume cause" sent in the RRC resume request message and the "resume cause" received in the RRC reject message are same. Accordingly at operation 308, the UE follows rest of the procedure as specified in 3GPP, TS 38.331.

However, in case the resume cause sent in the RRC resume request message and the resume cause in the RRC reject message are different, at operation 310, the UE sends a RRC setup request to the gNB based on the resume cause sent in the RRC resume request message and received message, considering that the air-interface is vulnerable from possible DoS attack. More specifically, the UE suspects network-attack connected with denial of service (DoS). Further, the UE sends in a network-set up request for establishing a new RRC connection based on a count of number of unsuccessful-mappings exceeding a threshold. Optionally, the UE reports vulnerability in the air-interface during sending the network set-up request.

In other words, if the resume cause sent in the RRC resume request message and the resume cause in the RRC release message are different, at operation 310, the UE initiates the procedure to transit to RRC_CONNECTED state instead of being in RRC_INACTIVE state or alternatively, the UE transits to RRC_IDLE state instead of being in RRC_INACTIVE state.

In the above discussed scenarios with respect to operation 310, the UE access stratum will perform following operations, when the resume cause value received is different than the resume cause value transmitted in RRCResumeRequest message and if the UE decides to send a RRC setup request to the gNB and/or receives RRC connection setup request from higher layers (for example, NAS):
  timer T380 and timer T390 are stopped if they are running
  Medium Access Control (MAC) is reset.
  timer T302 is also stopped if it is running
  all timers are stopped except T320 and T325.
  the UE inactive AS context is discarded
  variable 'pendingRnaUpdate' is set to 'FALSE', if that is set to 'TRUE',
  discard $K_{gNB}$ key, $K_{RRCenc}$ key, $K_{RRCint}$, $K_{UPint}$ key and $K_{UPenc}$ key, if any
  release all radio resources, including release of the RLC entity, the Medium Access Control (MAC) configuration and the associated PDCP entity and SDAP for all established RBs.

indicate the release of the RRC connection to upper layers together with the release cause i.e. 'securityReasons'.
  'RRC_IDLE' state will be entered and cell selection as specified in TS 38.304, 3GPP will be performed.

In the above discussed scenarios, the UE Non access stratum (NAS) will perform operations such as, in response to the reception of the release cause 'securityReasons': UE NAS enters 'EMM_IDLE' and triggers lower layer for the RRC connection setup request.

In contrast, in the current state of the art specified procedures (3GPP Release-15), there does not exist any mechanism to identify whether the resume cause transmitted by the UE is not modified/altered on the air interface, either by a rogue UE or by a fake gNodeB (gNB).

Figure 4:
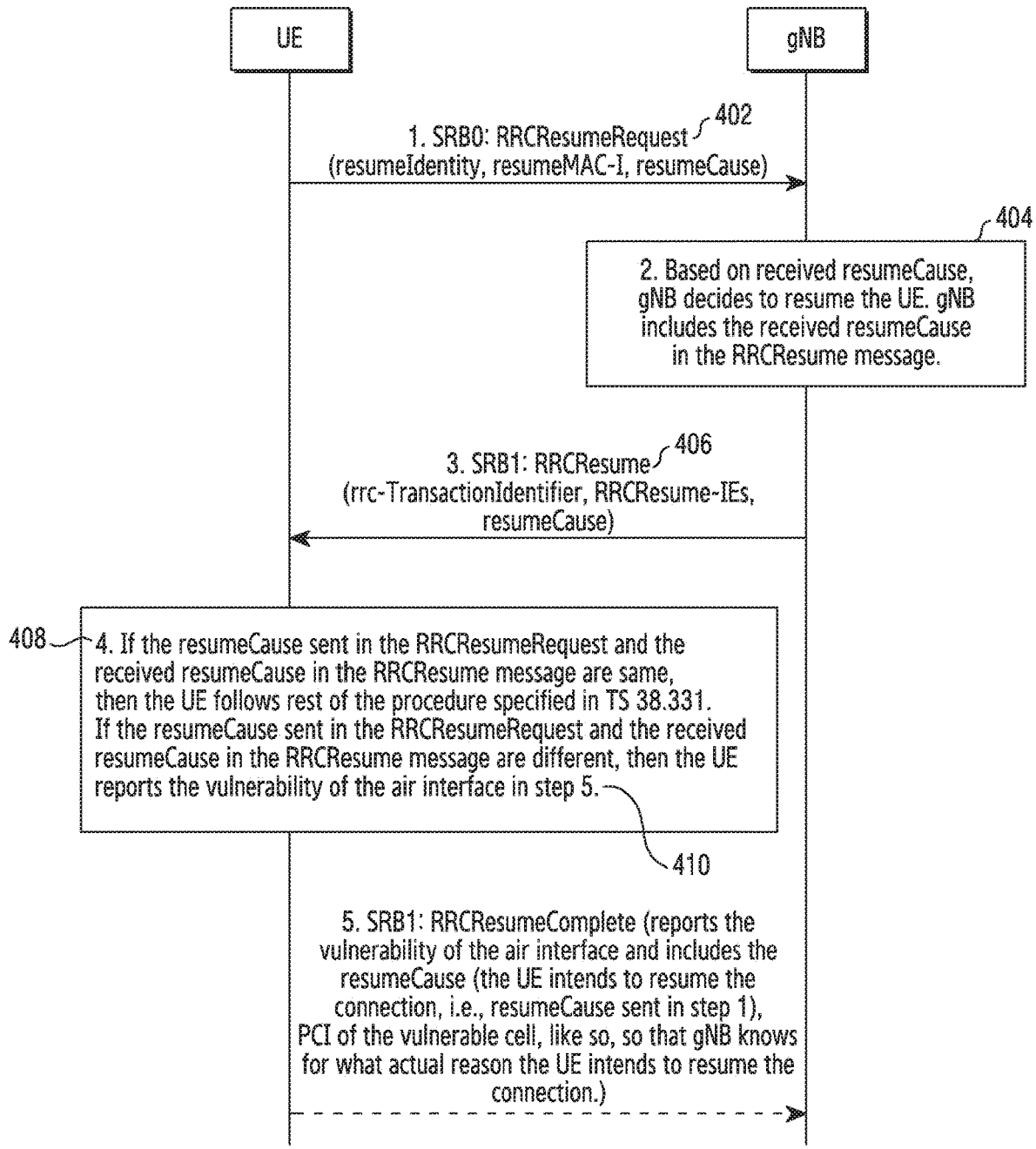
FIG. 4 illustrates a flowchart for a method of identifying, recovering and reporting manipulation of RRC signaling message on an air interface, when UE receives a RRCResume Response, according to an embodiment of the disclosure.

FIG. 4 illustrates a flowchart for a method of identifying, recovering and reporting manipulation of RRC signaling message on an air interface, when UE receives a RRCResume Response according to an embodiment of the disclosure.

Referring to FIG. 4, at operation 402, a UE transmits a RRC resume request message to a gNB. The RRC resume request message includes a 'resume Identity', a 'resume Message Authentication Code for Integrity/authenticity verification (MAC-I)', a 'resume cause' and other possible parameters. The RRC resume request message essentially corresponds to a request-message for resuming RRC connection to a base station and comprises a first parameter indicates a resume cause.

At operation 404, based on the received resume cause, the gNB decides to resume the UE (i.e., decides to move the UE to RRC_CONNECTED state). The gNB includes the 'resume cause' in a RRC resume message. The gNB includes the "resume cause" as a second parameter in a RRC resume message.

At operation 406, the RRC resume message is sent to the UE from the gNB. The RRC resume message includes 'rrc-Transaction identifier', RRC Resume-IEs, the 'resume cause' and other possible parameters. Specifically, the operation corresponds to receiving at the UE from the base station a response pertaining to at-least one of network-release or network resumption, the response comprising a second parameter defining "resume-cause".

In case, the resume cause sent in the RRC resume request message and the resume cause in the RRC resume message are same, at operation 408, the UE follows procedure as specified in 3GPP, TS 38.331.

However, in case the resume cause sent in the RRC resume request message and the resume cause in the RRC resume message are different, at operation 410, the UE sends a RRC resume complete message to the gNB. The UE reports manipulation of the resume cause on the air interface and inform the gNB of actual reason for which the UE intends to resume the RRC connection, in the RRC resume complete message.

The UE will perform the following operations upon reception of the RRC resume message:
  1> stop timer T319;
  1> stop timer T380, if running;
  1> if the RRCResume includes the fullConfig:
    2> perform the full configuration procedure as specified in 5.3.5.11;
  1> else:
  2> if drb-ContinueROHC is included:
    3> indicate to lower layers that drb-ContinueROHC is configured;

2> restore the masterCellGroupConfig and pdcp-Config from the UE Inactive AS context;
1> discard the UE Inactive AS context except the ran-NotificationAreaInfot;
1> if the RRCResume includes the masterCellGroup:
2> perform the cell group configuration for the received masterCellGroup according to 5.3.5.5;
1> if the RRCResume includes the radioBearerConfig:
2> perform the radio bearer configuration according to 5.3.5.6;
1> resume SRB2 and all DRBs;
1> if stored, discard the cell reselection priority information provided by the cellReselectionPriorities or inherited from another RAT;
1> stop timer T320, if running;
1> if the RRCResume message includes the measConfig:
2> perform the measurement configuration procedure as specified in 5.5.2;
1> resume measurements if suspended;
1> if T390 is running:
2> stop timer T390 for all access categories;
2> perform the actions as specified in 5.3.14.4.
1> stop timer T302, if running;
1> enter RRC_CONNECTED;
1> indicate to upper layers that the suspended RRC connection has been resumed;
1> stop the cell re-selection procedure;
1> consider the current cell to be the Pcell;
1> set the content of the of RRCResumeComplete message as follows:
2> if the resume cause included in RRCResume is different than the resume cause included in RRCResumeRequest or RRCResumeRequest1:
3> include the resume cause previously sent in RRCResumeRequest or RRCResumeRequest1 message;
3> include the indicator indicating vulnerability of air interface;
3> include the PCI of the cell, where the RRCResume message received;
2> if the upper layer provides NAS PDU, set the dedicatedNAS-Message to include the information received from upper layers;
2> if the upper layer provides a PLMN, set the selectedPLMN-Identity to PLMN selected by upper layers (TS 24.501 [23]) from the PLMN(s) included in the plmn-IdentityList in SIB1;
2> if the masterCellGroup contains the reportUplinkTxDirectCurrent:
3> include the uplinkTxDirectCurrentList;
1> submit the RRCResumeComplete message to lower layers for transmission.

Figure 5:
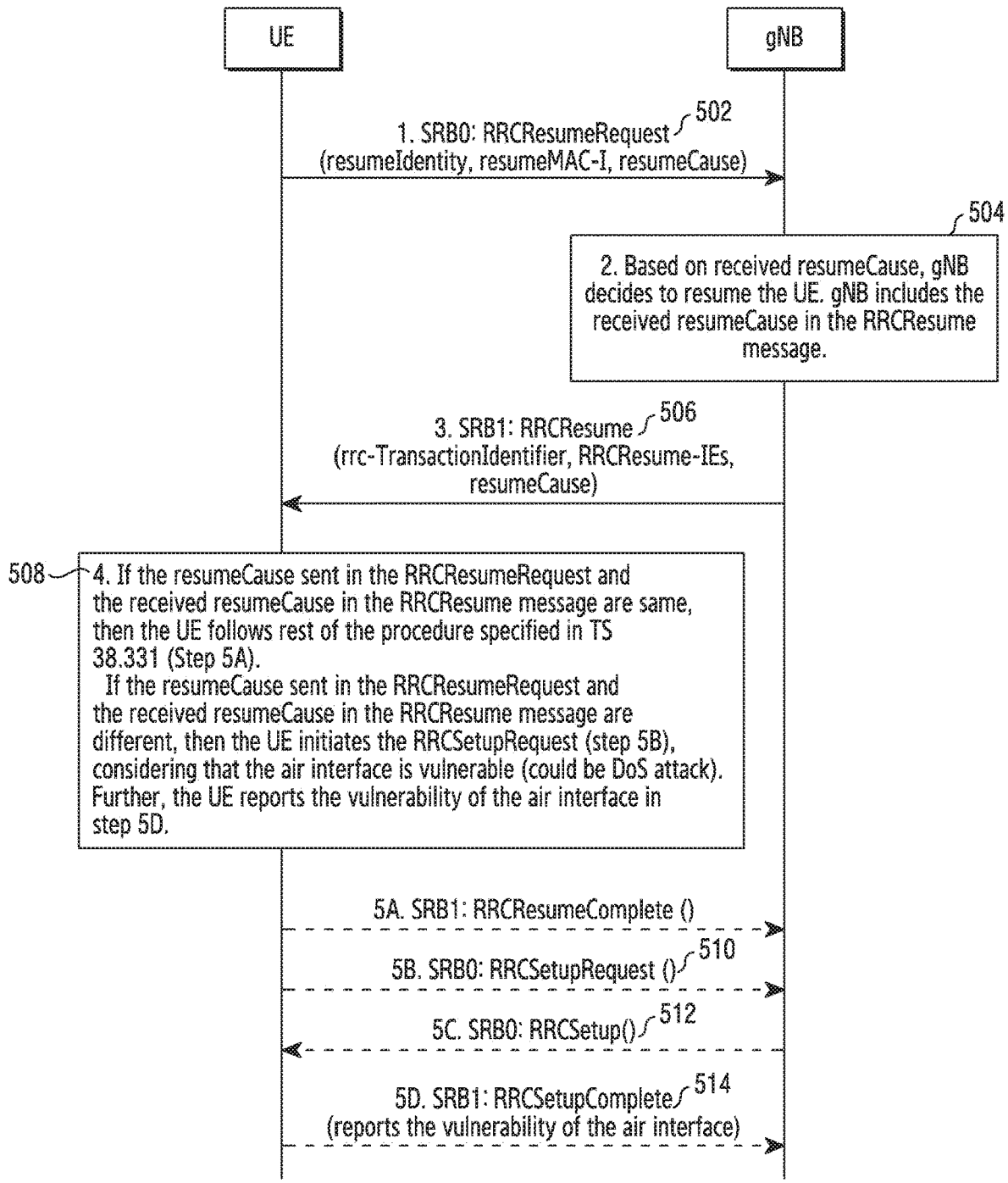
FIG. 5 illustrates a flowchart for a method of identifying, recovering and reporting manipulation of a RRC signaling message on an air interface, when UE receives a RRCResume Response and decides to establish a new RRC connection according to an embodiment of the disclosure.

FIG. 5 illustrates a flowchart for a method of identifying, recovering and reporting manipulation of RRC signaling message on an air interface, when UE receives a RRCResume Response and decides to establish a new RRC connection according to an embodiment of the disclosure.

Referring to FIG. 5, at operation 502, a UE transmits a RRC resume request message to a gNB. The RRC resume request message includes a 'resume Identity', a 'resume Message Authentication Code for Integrity/authenticity verification (MAC-I)', a 'resume cause' and other possible parameters. The RRC resume request message essentially corresponds to a request-message for resuming RRC connection to a base station and comprises a first parameter indicating the resume cause.

At operation 504, based on the received resume cause, the gNB decides to resume the UE. In another embodiment, the gNB decides to release the UE. The gNB includes the 'resume cause' in a RRC resume message along with other possible parameters, if the gNB decides to resume the UE. In case, if the gNB decides to release the UE, then the gNB includes the 'resume cause' in a RRC release message.

At operation 506, the RRC resume message is sent to the UE from the gNB (if, gNB decides to resume the UE). The RRC resume message includes 'rrc-Transaction identifier', RRC Resume-IEs, the 'resume cause' and other possible parameters. Specifically, the operation corresponds to receiving at the UE from the base station a response pertaining to at-least one of network-release or network resumption, the response comprising a second parameter indicating a resume cause.

In case, the resume cause sent in the RRC resume request message and the resume cause in the RRC resume message are same, at operation 508, the UE follows procedure as specified in 3GPP, TS 38.331. That is the UE sends the RRC Resume Complete message.

However, in case the resume cause sent in the RRC resume request message and the resume cause in the RRC resume message are different, at operation 510, the UE sends a RRC setup request to the gNB (to establish a new RRC connection), considering that the air interface is vulnerable from possible DoS attack.

In response, at operation 512, the gNB send a RRC setup message. Further, in operation 514, the UE sends a RRC setup complete message to the gNB and includes report on manipulation of the resume cause on the air interface.

In an embodiment, at operation 506, the RRC release message is sent to the UE from the gNB (if, gNB decides to release the UE). The RRC release message includes 'resume cause' received in the RRC Resume Request message. In case, the resume cause sent in the RRC release request message and the resume cause in the RRC resume message are same, at operation 508, the UE follows procedure as specified in 3GPP, TS 38.331.

However, in case the resume cause sent in the RRC resume request message and the resume cause in the RRC release message are different, at operation 510, the UE sends a RRC setup request to the gNB (to establish a new RRC connection (security context)), considering that the air interface is vulnerable from possible DoS attack. In response, at operation 512, the gNB send a RRC setup message. Further, in operation 514, the UE sends a RRC setup complete message to the gNB and includes report on manipulation of the resume cause on the air interface. More specifically, the UE suspect network-attack connected with denial of service (DoS). Further, the UE sends in a network-set up request for establishing a new RRC connection based on a count of number of unsuccessful-mappings exceeding a threshold. Optionally, the UE reports vulnerability in the air-interface during sending the network set-up request.

Figure 6:
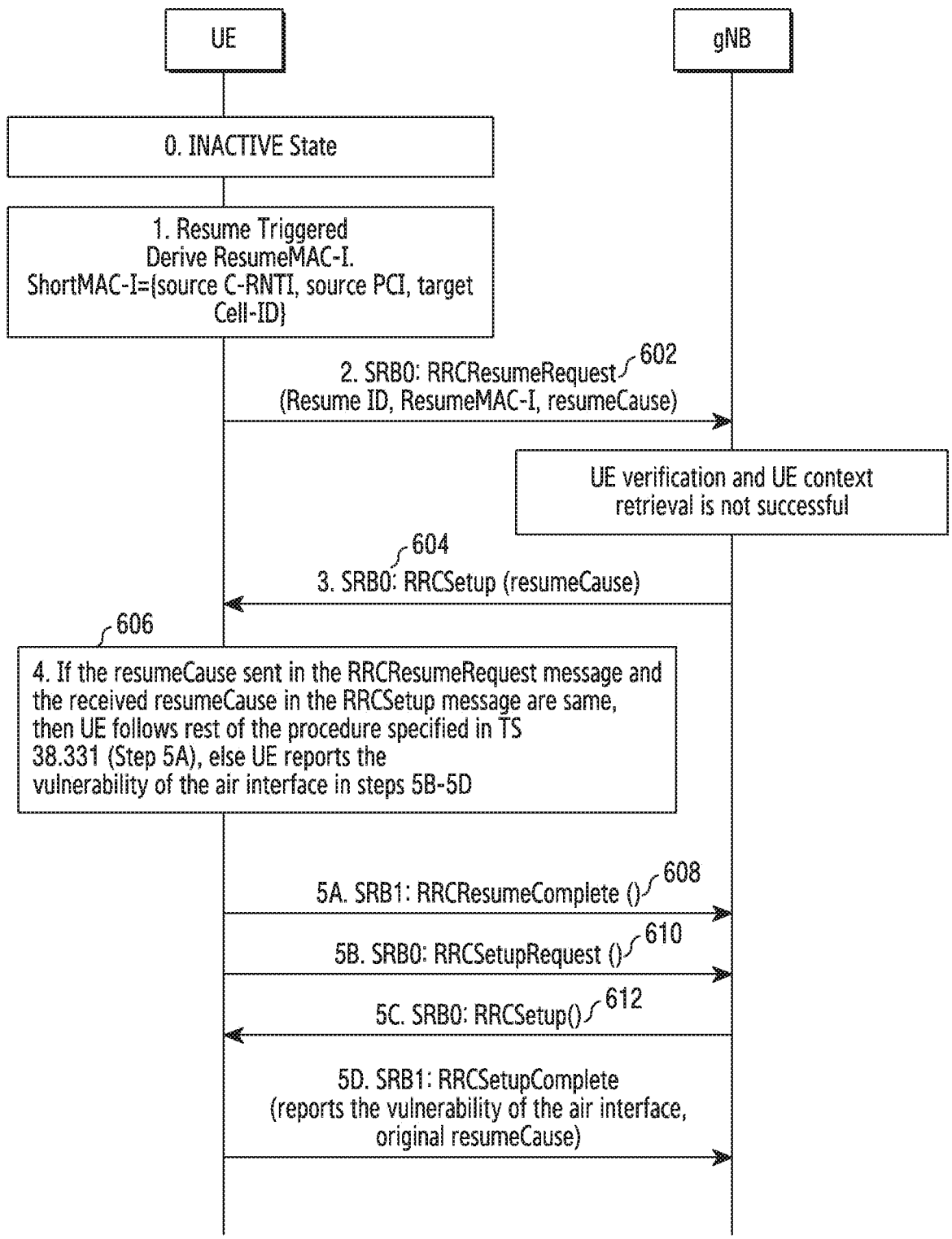
FIG. 6 illustrates a flowchart for a method of identifying and reporting manipulation of a RRC signaling message on an air interface using RRC setup procedure according to an embodiment of the disclosure.

The UE will perform the following operations upon reception of the RRC setup message:
1> if the RRCSetup is received in response to an RRCReestablishmentRequest; or
1> if the RRCSetup is received in response to an RRCResumeRequest or RRCResumeRequest1:
2> discard any stored UE Inactive AS context and suspendConfig;
2> discard any current AS security context including the $K_{RRCenc}$ key, the $K_{RRCint}$ key, the $K_{UPint}$ key and the $K_{UPenc}$ key;
2> release radio resources for all established RBs except SRB0, including release of the RLC entities, of the associated PDCP entities and of SDAP;

2> release the RRC configuration except for the default MAC Cell Group configuration and CCCH;
2> indicate to upper layers fallback of the RRC connection;
2> stop timer T380, if running;
1> perform the cell group configuration procedure in accordance with the received masterCellGroup and as specified in 5.3.5.5;
1> perform the radio bearer configuration procedure in accordance with the received radioBearerConfig and as specified in 5.3.5.6;
1> if stored, discard the cell reselection priority information provided by the cellReselectionPriorities or inherited from another RAT;
1> stop timer T300, T301 or T319 if running;
1> if T390 is running:
2> stop timer T390 for all access categories;
2> perform the actions as specified in 5.3.14.4.
1> stop timer T302, if running;
1> stop timer T320, if running;
1> if the RRCSetup is received in response to an RRCResumeRequest or RRCResumeRequest1RRCResumeRequest1 or RRCSetupRequest:
2> enter RRC_CONNECTED;
2> stop the cell re-selection procedure;
1> consider the current cell to be the PCell;
1> set the content of RRCSetupComplete message as follows:
2> if the RRCSetupRequest was triggered by upper layers due to vulnerability of air interface:
3> include the indicator indicating vulnerability of air interface;
3> include the resume cause previously sent in RRCResumeRequest or RRCResumeRequest1 message;
3> include the PCI of the cell, where the RRCResume message received
2> if upper layers provide an 5G-S-TMSI:
3> if the RRCSetup is received in response to an RRC-SetupRequest:
4> set the ng-5G-S-TMSI-Value to ng-5G-S-TMSI-Part2;
3> else:
4> set the ng-5G-S-TMSI-Value to ng-5G-S-TMSI;
2> set the selectedPLMN-Identity to the PLMN selected by upper layers (TS 24.501 [23]) from the PLMN(s) included in the plmn-IdentityList in SIB1;
2> if upper layers provide the 'Registered AMF':
3> include and set the registeredAMF as follows:
4> if the PLMN identity of the 'Registered AMF' is different from the PLMN selected by the upper layers:
5> include the plmnIdentity in the registeredAMF and set it to the value of the PLMN identity in the 'Registered AMF' received from upper layers;
4> set the amf-Identifier to the value received from upper layers;
3> include and set the guami-Type to the value provided by the upper layers;
2> if upper layers provide one or more S-NSSAI (see TS 23.003 [21]):
3> include the s-nssai-List and set the content to the values provided by the upper layers;
2> set the dedicatedNAS-Message to include the information received from upper layers;
submit the RRCSetupComplete message to lower layers for transmission, upon which the procedure ends
FIG. 6 illustrates a flowchart for a method of identifying and reporting manipulation of a RRC signaling message on an air interface using RRC setup procedure, according to an embodiment of the disclosure.

Referring to FIG. 6, a UE is in 'RRC_INACTIVE' state. To initiate the RRC connection establishment, at operation 602, a UE transmits a RRC resume request message to a gNB. The RRC resume request message includes a 'resume Identity', a 'resume Message Authentication Code for Integrity/authenticity verification (MAC-I)', a 'resume cause' and other possible parameters. In the embodiment, the UE verification and the UE context retrieval fails at the gNB. The gNB, at operation 604, sends a RRC setup message including the 'resume cause' along with other possible parameters.

Referring to FIG. 6, the resume cause sent in the RRC resume request message and the resume cause in the RRC setup message are same, at operation 606, the UE follows procedure as specified in 3GPP, TS 38.331. That is, the UE sends the RRC Setup Complete Message to the gNB, in response to the received RRC Setup message.

However, in case the resume cause sent in the RRC resume request message and the resume cause in the RRC setup message are different, at operation 608, the UE sends a RRC setup request to the gNB, considering that the air interface is vulnerable from possible DoS attack (which means the UE is likely to establish a new fresh RRC connection). In response, at operation 610, the gNB send another RRC setup-message. Further, in operation 612, the UE sends a RRC setup complete message to the gNB and includes the report on manipulation of the resume-cause on the air interface. More specifically, the UE suspect network-attack connected with denial of service (DoS). Further, the UE sends in a network-set up request for establishing a new RRC connection based on a count of number of unsuccessful-mappings exceeding a threshold. Optionally, the UE reports vulnerability in the air-interface during sending the network set-up request.

In an another embodiment, the UE includes the report on manipulation of the resume cause on the air interface at operation 606 in the RRC setup complete message (at 5A) (which means, the UE wish to use the same security context and at the same time, reports the manipulation of the resume cause on the air interface).

Figure 7:
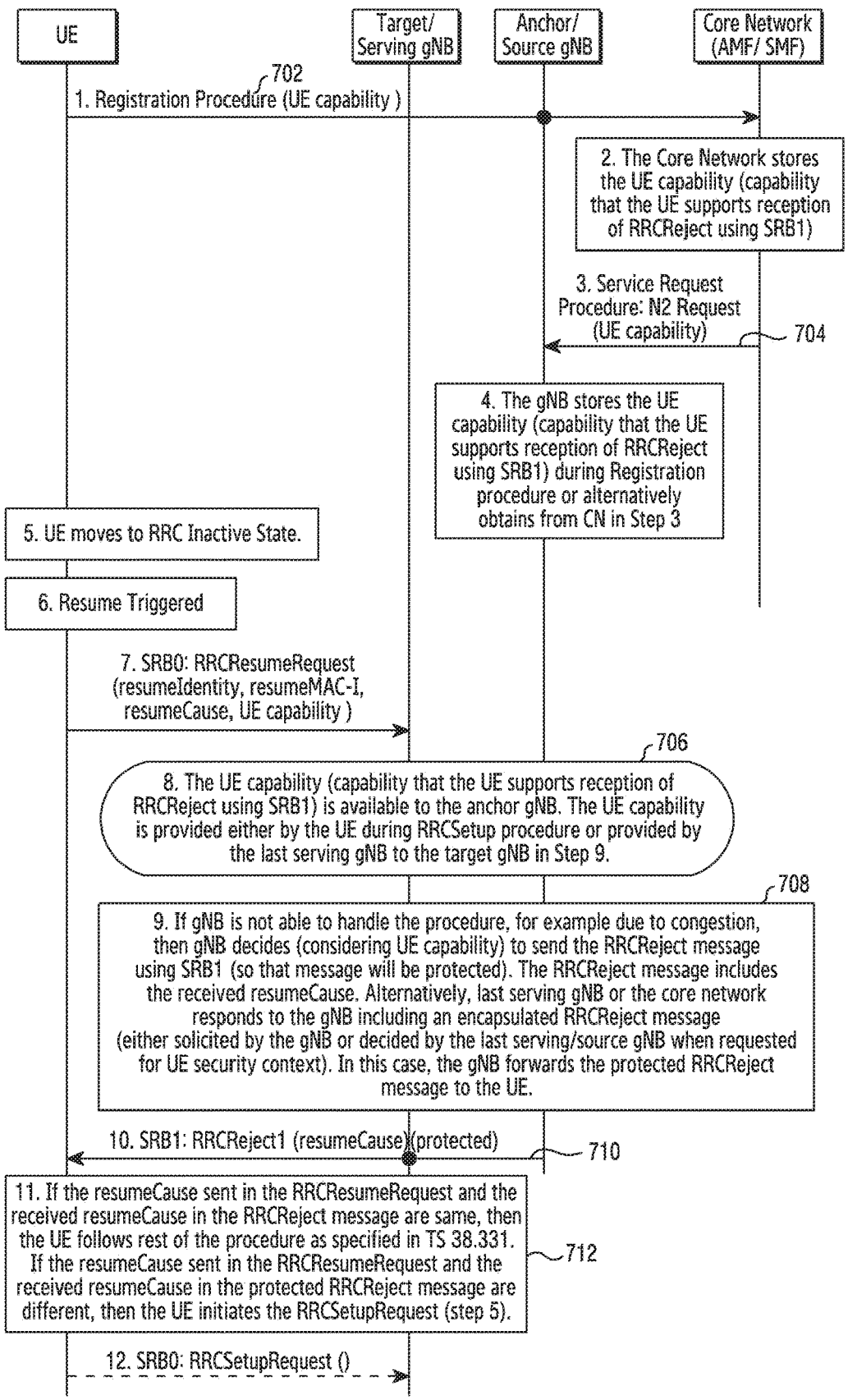
FIG. 7 illustrates a flowchart for a method of sending a protected RRC Reject message on an air interface using SRB1 according to an embodiment of the disclosure.

The UE will perform the following operations upon reception of the RRC setup message:
1> if the RRCSetup is received in response to an RRCReestablishmentRequest; or
1> if the RRCSetup is received in response to an RRCResumeRequest or RRCResumeRequest1:
2> discard any stored UE Inactive AS context and suspendConfig;
2> discard any current AS security context including the $K_{RRCenc}$ key, the $K_{RRCint}$ key, the $K_{UPint}$ key and the $K_{UPenc}$ key;
2> release radio resources for all established RBs except SRB0, including release of the RLC entities, of the associated PDCP entities and of SDAP;
2> release the RRC configuration except for the default MAC Cell Group configuration and CCCH;
2> if the resume cause included in RRCSetup message is different than the resume cause included in RRCResumeRequest or RRCResumeRequest1:
3> indicate the release of the RRC connection to upper layers together with the release cause i.e. security reasons;
2> else indicate to upper layers fallback of the RRC connection;
2> stop timer T380, if running;

1> perform the cell group configuration procedure in accordance with the received masterCellGroup and as specified in 5.3.5.5;
1> perform the radio bearer configuration procedure in accordance with the received radioBearerConfig and as specified in 5.3.5.6;
1> if stored, discard the cell reselection priority information provided by the cellReselectionPriorities or inherited from another RAT;
1> stop timer T300, T301 or T319 if running;
1> if T390 is running:
2> stop timer T390 for all access categories;
2> perform the actions as specified in 5.3.14.4.
1> stop timer T302, if running;
1> stop timer T320, if running;
1> if the RRCSetup is received in response to an RRCResumeRequest or RRCResumeRequest1RRCResumeRequest1 or RRCSetupRequest:
2> enter RRC_CONNECTED;
2> stop the cell re-selection procedure;
1> consider the current cell to be the PCell;
1> set the content of RRCSetupComplete message as follows:
2> if the RRCSetupRequest was triggered by upper layers due to vulnerability of air interface:
3> include the indicator indicating vulnerability of air interface;
3> include the resume cause previously sent in RRCResumeRequest or RRCResumeRequest1 message;
3> include the PCI of the cell, where the RRCResume message received
2> if upper layers provide an 5G-S-TMSI:
3> if the RRCSetup is received in response to an RRCSetupRequest:
4> set the ng-5G-S-TMSI-Value to ng-5G-S-TMSI-Part2;
3> else:
4> set the ng-5G-S-TMSI-Value to ng-5G-S-TMSI;
2> set the selectedPLMN-Identity to the PLMN selected by upper layers (TS 24.501 [23]) from the PLMN(s) included in the plmn-IdentityList in SIB1;
2> if upper layers provide the 'Registered AMF':
3> include and set the registeredAMF as follows:
4> if the PLMN identity of the 'Registered AMF' is different from the PLMN selected by the upper layers:
5> include the plmnIdentity in the registeredAMF and set it to the value of the PLMN identity in the 'Registered AMF' received from upper layers;
4> set the amf-Identifier to the value received from upper layers;
3> include and set the guami-Type to the value provided by the upper layers;
2> if upper layers provide one or more S-NSSAI (see TS 23.003 [21]):
3> include the s-nssai-List and set the content to the values provided by the upper layers;
2> set the dedicatedNAS-Message to include the information received from upper layers;
1> submit the RRCSetupComplete message to lower layers for transmission, upon which the procedure ends FIG. 7 illustrates a flowchart for a method of sending a protected RRC Reject message on an air interface using SRB1 in accordance with another embodiment of the disclosure. In the embodiment, in-order to ensure that the authenticity of the RRCReject message (that is, it is from the genuine gNB and the contents in the RRCReject message are not modified), the RRCReject message is protected (integrity protected and/or Confidentiality protected (encrypted)). The RRCReject message protection is achieved by sending the message over SRB1 according to an embodiment of the disclosure.

Referring to FIG. 7, at operation 702, during Registration procedure, the gNB obtains and stores the UE capability from the UE (UE capability that the UE supports reception of RRCReject using SRB (reception of RRCReject1) or obtains and stores the UE capability from core network (CN) in operation 704. Then the UE moves to RRC_INACTIVE state and then based on the triggers from the higher layer or due to mobility, a UE transmits a RRC resume request message to a gNB. The RRC resume request message includes, but not limited to: a 'resume Identity', a 'resume Message Authentication Code for Integrity/authenticity verification (MAC-I)', a 'resume cause' and optionally 'UE capability'. In the embodiment, the 'UE capability' is a capability of the UE for supporting reception of RRCReject using "Signaling Radio Bearer (SRB) 1". In one example, the UE capability is provided at operation 706. In another example, the UE capability is provided a last serving gNB to the anchor gNB. Further, in another example, the UE provides its capability in the RRC resume request message. At operation 708, the gNB includes the received resume cause in a RRC reject message (as gNB not able to handle the resume procedure), considering the UE capability, and the gNB decides to send the RRC reject message using SRB1 to protect the RRC reject message (RRCReject1). In the current embodiment, the gNB is not able to handle the procedure, for example, due to congestion.

In another implementation, at operation 708, the last serving gNB responds the gNB including the RRC reject message encapsulated, either solicited by the gNB or decided by the last serving gNB when requested for the UE security context. In the implementation, the gNB forwards the RRC reject message to the UE, at operation 710.

In case, the resume cause sent in the RRC resume request message and the resume cause in the RRC reject message are same, at operation 712, the UE follows procedure as specified in 3GPP, TS 38.331. However, in case the resume cause sent in the RRC resume request message and the resume cause in the RRC reject message are different, at operation 712, the UE sends a RRC setup request to the gNB (decides to establish a new RRC connection) and optionally includes the report on manipulation of the resume cause on the air interface. More specifically, the UE suspect network-attack connected with denial of service (DoS). Further, the UE sends in a network-set up request for establishing a new RRC connection based on a count of number of unsuccessful-mappings exceeding a threshold. Optionally, the UE reports vulnerability in the air-interface during sending the network set-up request.

In an implementation, the detail of the RRCReject1 is as follows:
RRCReject1
The RRCReject1 message is used to reject an RRC connection establishment or an RRC connection resumption.
Signaling radio bearer: SRB1
RLC-SAP: AM
Logical channel: DCCH
Direction: Network to UE In an implementation, an RRCReject1 message is sent on a SRB1 including the resume cause received by the gNB in an 'RRCResumeRequest' message. The target gNB upon reception of the 'RRCResumeRequest' message, if there is overload situation or congestion, then the target gNB decides to reject a UE. However, the UE is rejected only after UE verification is done by an anchor gNB. For UE verification the target gNB initiates the context retrieval procedure with anchor gNB, providing 'resumeMAC-I' and 'resumeidentity' to the anchor gNB. Based on the 'resume-identity' the anchor gNB identifies the UE context and computes the 'resumeMAC-I'. This is used for UE verification by comparing the computed 'resumeMAC-I' with the 'resumeMAC-I' forwarded by the target gNB. If the UE verification is successful, either the UE context is transferred to the target gNB by the anchor gNB or the anchor gNB can reject the UE.

The anchor gNB decides to reject the UE upon successful UE verification, if the target gNB includes reject cause in the context retrieval request message. If the reject cause is not included in the context retrieval request message then upon successful UE verification the anchor gNB transfers the UE context to the target gNB.

In the implementation, a capability indicator is present in the 'RRCResumeRequest' message. Alternatively (for example, if there is size constraint in which case the capability indicator cannot be accommodated in the 'RRCResumeRequest' message), the UE context stored at the anchor gNB should be flagged with such capability, when the UE context and capability is fetched from the core network. Depending on, either the UE capability indicator included in the 'RRCResumeRequest' message or the capability flag associated with the stored UE context at the anchor gNB, the UE can be rejected either on a SRB0 or a SRB1. The security protected 'RRCReject1' message is protected with new AS key derived based on the NCC provided to the UE, when the UE was suspended by the anchor gNB. If the target gNB protects the 'RRCReject1' message then the new AS key is derived by the anchor gNB and provided to the target gNB along with the UE context.

In another implementation, the anchor gNB itself protects the 'RRCReject1' message with the new AS key and sends this protected message to the target gNB which transparently forward the message to the UE on SRB1. Regardless of which ever node protects the 'RRCReject1' message which includes the resume cause, the UE may be transparent to the entity which actually protected the message.

In an embodiment, the calculation of InactiveMAC-I includes the UE capability as one of the input parameter.

In a scenario, even if the UE is capable of handling security protected 'RRCReject1' message on SRB1, the target gNB or the anchor gNB may be legacy nodes in which case the 'RRCReject1' message cannot be sent to the UE. In such cases, the UE is expected to receive 'RRCReject' message on SRB0.

Figure 8:
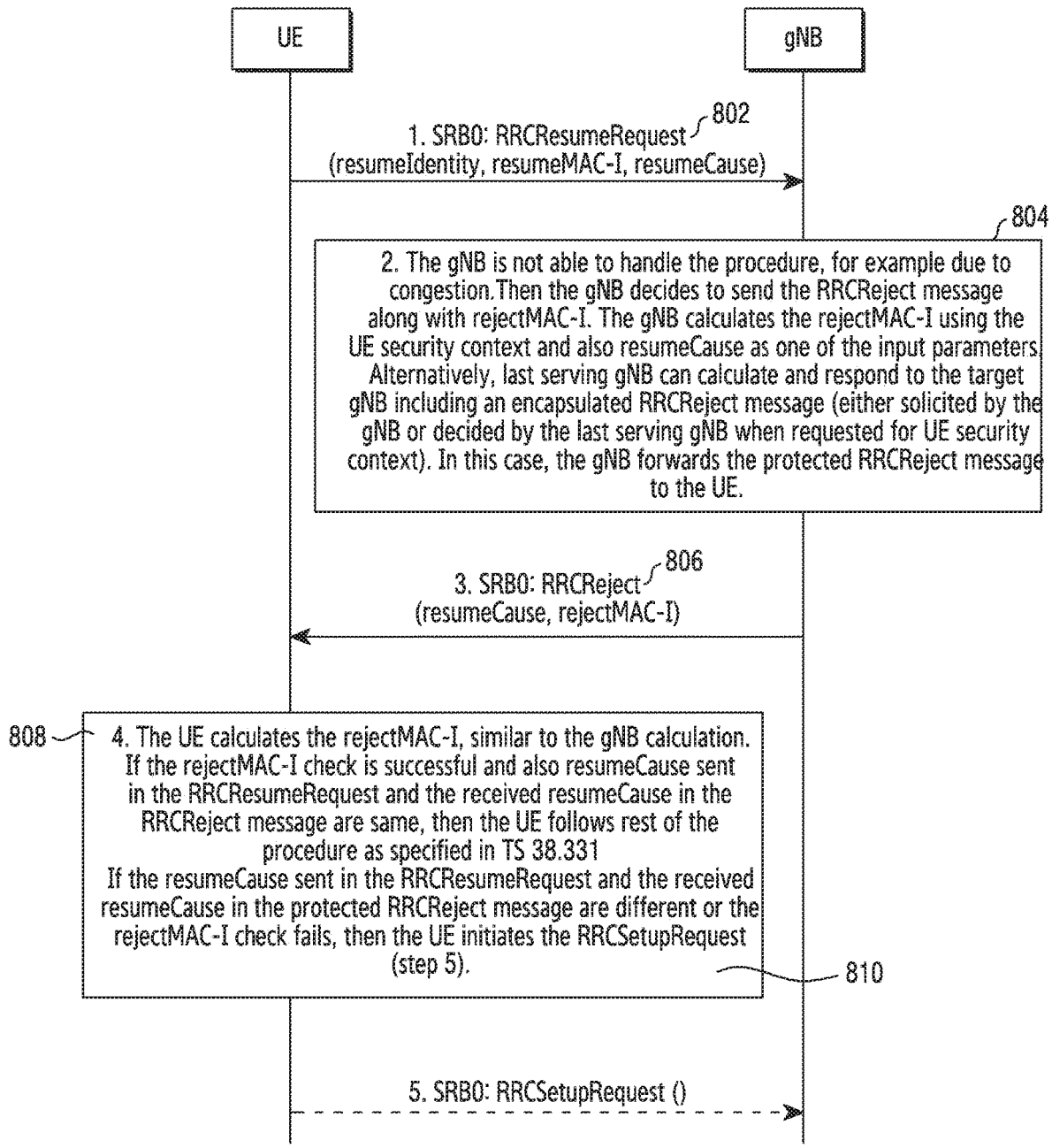
FIG. 8 illustrates a flowchart for a method of sending a RRC Reject message on an air interface along with message digest/hashing/integrity protection to a UE for authenticity verification according to an embodiment of the disclosure.

FIG. 8 illustrates a flowchart for a method of sending a RRC Reject message on an air interface along with message digest/hashing/integrity protection to a UE for authenticity verification, according to an embodiment of the disclosure. In the embodiment, in-order to ensure that the authenticity of the RRCReject message (that is, it is from the genuine gNB and the contents in the RRCReject message are not modified), the RRCReject message is protected (integrity protected). The RRCReject message protection is achieved by calculating and including the reject Message Authentication Code for Integrity/authenticity verification (reject-MAC-I) using the stored UE AS security context in the RRCReject message and transmitted over the SRB0.

Referring to FIG. 8, at operation 802, a UE transmits a RRC resume request message to a gNB. The RRC resume request message includes a 'resume Identity', a 'resume Message Authentication Code for Integrity/authenticity verification (MAC-I)', a 'resume cause' and other possible parameters. In the embodiment, the gNB is not able to handle the procedure, for example, due to congestion.

At operation 804, the gNB includes additionally the received resume cause in a RRC reject message along with a reject Message Authentication Code for Integrity/authenticity verification (rejectMAC-I). More specifically, in case of network rejects the request, an RRC reject message is received by the UE from the base station. The RRC reject message comprises a first-message authentication code computed by the base station based on a stored network security context;

At operation, 806, the gNB sends the RRC reject message to the UE. The RRC reject message includes optionally the resume cause, the reject Message Authentication Code for Integrity/authenticity verification (rejectMAC-I) and other possible parameters. More specifically, in case of network rejects the request, an RRC reject message is received by the UE from the base station. The RRC reject message comprises a first-message authentication code computed by the base station based on a stored network security context;

In an embodiment, when the source gNB decides to reject the RRC Resume Request message from the UE (either solicited by the target gNB or decided by the last serving gNB when requested for the UE security context), the RRC Reject message shall include additionally at least one of the: resume cause and a RejectMAC-I. Then the target gNB forwards the encapsulated RRCReject message to the UE. The rejectMAC-I is the message authentication code or the first message authentication code. The source gNB calculates rejectMAC-I (i.e., the first message authentication code) using the integrity algorithm (NIA) in the stored AS security context, which was negotiated between the UE and the source gNB and the current $K_{RRCint}$ with the following inputs:

KEY: it shall be set to current $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input as defined in TS 38.331 with at least one of the following inputs: I-RNTI, resume cause, target Cell-ID, waitTime (RejectWaitTime), source C-RNTI, source PCI, other possible parameters.

In an embodiment, the target/serving gNB calculates RejectMAC-I (i.e. the first message authentication code) using the integrity algorithm (NIA) in the stored AS security context (provided by the last serving/anchor gNB, which was negotiated between the UE and the source gNB) and the new $K_{RRCint}$ derived by the target/serving gNB using the $K_{gNB}*$ provided by the serving/anchor gNB with the following inputs:

KEY: it shall be set to current $K_{RRCint}$;
BEARER: all its bits shall be set to 1.
DIRECTION: its bit shall be set to 1;
COUNT: all its bits shall be set to 1;
MESSAGE: it shall be set to VarResumeMAC-Input as defined in TS 38.331 with at least one of the following inputs: I-RNTI, resume cause, target Cell-ID, waitTime (RejectWaitTime), source C-RNTI, source PCI, other possible parameters;

If the RejectMAC-I is calculated/derived by the target/serving gNB, then the target provides the necessary security information (like, the NCC associated to the KgNB* and optionally the integrity algorithm (NIA) ID if different algorithm is used) to the UE in the RRCReject message.

In the embodiment, the UE calculates the reject Message Authentication Code for Integrity/authenticity verification (rejectMAC-I) as the second message authentication code similar to gNB calculation. In case, the reject Message Authentication Code for Integrity/authenticity verification (rejectMAC-I) check is successful and the resume cause sent in the RRC resume request message and the resume cause in the RRC reject message are same, at operation 808, the UE follows procedure as specified in 3GPP TS 38.331. More specifically, the second-message authentication code is mapped by the UE with the first message authentication code. Such second code is computed by the UE based on the stored network security context similar to gNB calculation.

However, if the reject Message Authentication Code for Integrity/authenticity verification (rejectMAC-I) check fails or the resume cause sent in the RRC resume request message and the resume cause in the RRC reject message are different, at operation 810, the UE sends a RRC setup request to the gNB (to establish a new RRC connection), considering that the air interface is vulnerable from possible DoS attack. More specifically, the UE suspect network-attack connected with denial of service (DoS). Further, the UE sends in a network-set up request for establishing a new RRC connection based on a count of number of unsuccessful-mappings exceeding a threshold. Optionally, the UE reports vulnerability in the air-interface during sending the network set-up request.

Figure 9:
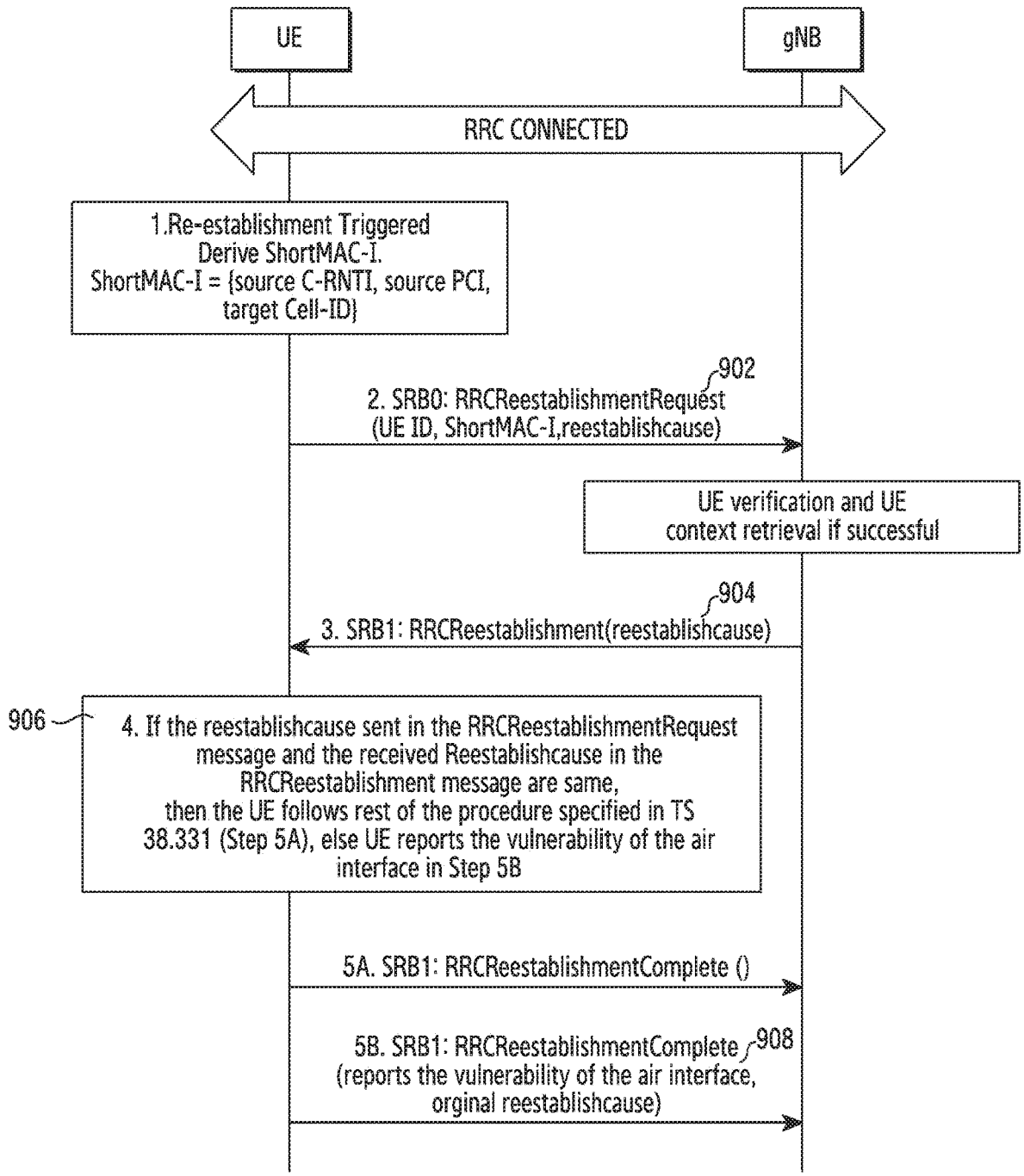
FIG. 9 illustrates a flowchart for a method of reporting manipulation of RRC signaling message on an air interface during a re-establishment procedure using a RRC Re-establishment Complete message according to an embodiment of the disclosure.

FIG. 9 illustrates a flowchart for a method of reporting manipulation of RRC signaling message on an air-interface, during re-establishment procedure, using a RRC Re-establishment Complete message according to an embodiment of the disclosure.

Referring to FIG. 9, a UE is in 'RRC_CONNECTED' state. To initiate the RRC connection re-establishment, at operation 902, a UE transmits a RRC re-establishment request to a gNB. The RRC re-establishment request includes at least one of: a 'UE Identity', a 'Short Message Authentication Code for Integrity/authenticity verification (MAC-I)' and a 're-establish cause'. In the embodiment, the UE verification and the UE context retrieval is successful. The gNB, at operation 904, sends a RRC re-establishment message including the 're-establish cause'.

In case, the re-establish cause sent in the RRC re-establishment request and the resume cause in the RRC re-establishment message are same, at operation 906, the UE follows procedure as specified in 3GPP, TS 38.331.

However, in case the re-establish cause sent in the RRC re-establishment request and the resume cause in the RRC re-establishment message are different, at operation 908, the UE sends a RRC re-establishment complete message to the gNB and includes report on manipulation of the re-establish cause on the air interface.

The UE will perform the following operations upon reception of the RRC re-establishment message:
1> stop timer T301;
1> consider the current cell to be the PCell;
1> store the nextHopChainingCount value indicated in the RRCReestablishment message;
1> update the $K_{gNB}$ key based on the current $K_{gNB}$ or the NH, using the stored nextHopChainingCount value, as specified in TS 33.501 [11];
1> derive $K_{RRCenc}$ and $K_{UPenc}$ key associated with the previously configured cipheringAlgorithm, as specified in TS 33.501 [11];
1> derive the $K_{RRCint}$ and $K_{UPint}$ key associated with the previously configured integrityProtAlgorithm, as specified in TS 33.501 [11].

Figure 10:
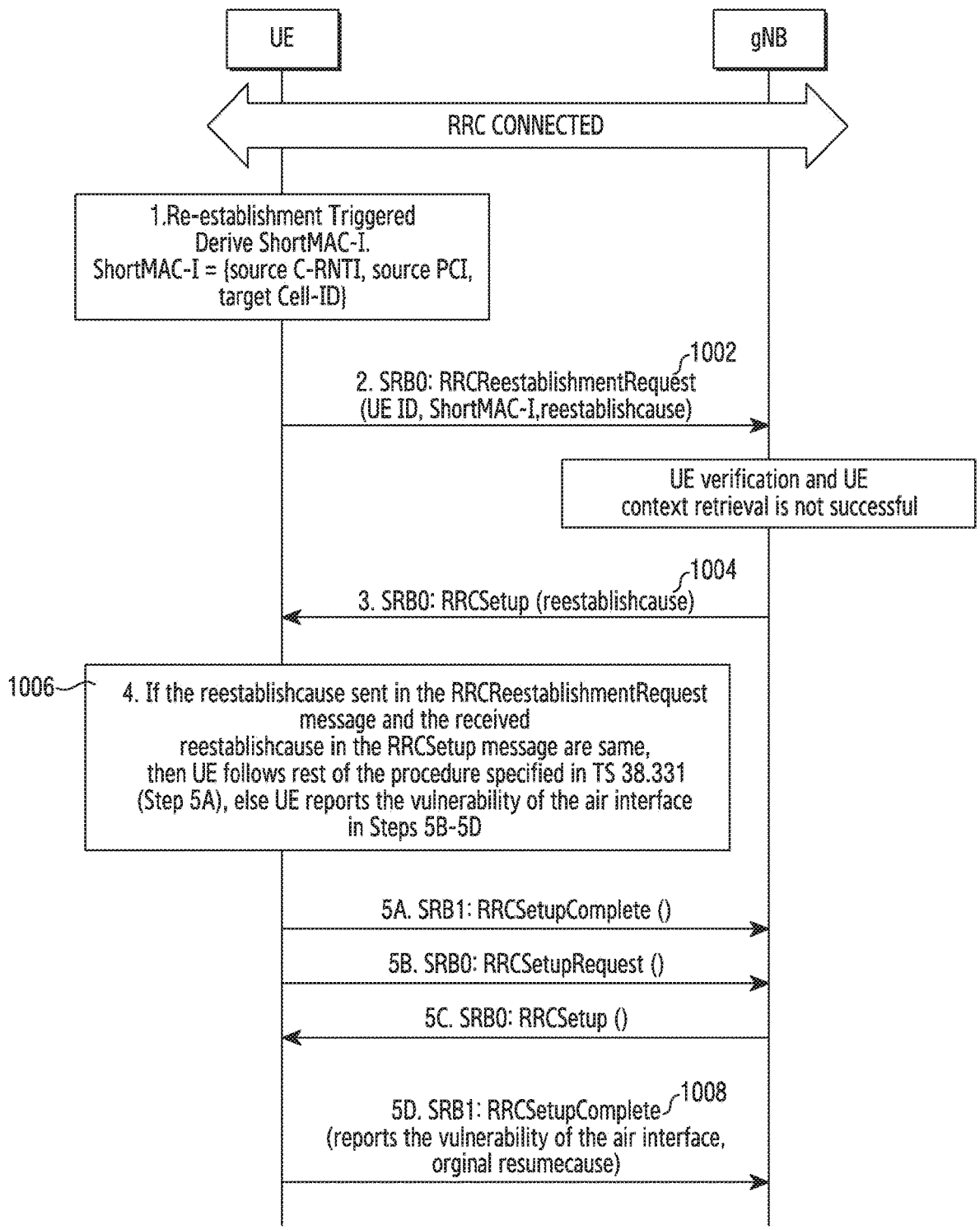
FIG. 10 illustrates a flowchart for a method of reporting manipulation of RRC signaling message on an air interface using a RRC Setup Complete message during a re-establishment procedure according to an embodiment of the disclosure.

1> request lower layers to verify the integrity protection of the RRCReestablishment message, using the previously configured algorithm and the $K_{RRCint}$ key;
1> if the integrity protection check of the RRCReestablishment message fails:
2> perform the actions upon going to RRC_IDLE as specified in 5.3.11, with release cause 'RRC connection failure', upon which the procedure ends;
1> configure lower layers to resume integrity protection for SRB1 using the previously configured algorithm and the $K_{RRCint}$ key immediately, i.e., integrity protection shall be applied to all subsequent messages received and sent by the UE, including the message used to indicate the successful completion of the procedure;
1> configure lower layers to resume ciphering for SRB1 using the previously configured algorithm and, the $K_{RRCenc}$ key immediately, i.e., ciphering shall be applied to all subsequent messages received and sent by the UE, including the message used to indicate the successful completion of the procedure;
1> release the measurement gap configuration indicated by the measGapConfig, if configured;
1> if the reestablishment cause included in RRCReestablishment is different than the reestablishment cause included in RRCReestablishmentRequest:
2> include the following in the RRCReestablishmentComplete message:
3> the reestablishment cause previously sent in RRCReestablishmentRequest message;
3> the indicator indicating vulnerability of air interface;
1> submit the RRCReestablishmentComplete message to lower layers for transmission;

FIG. 10 illustrates a flowchart for a method of reporting manipulation of RRC signaling message on an air interface, during re-establishment procedure, using RRC Setup Complete message, according to an embodiment of the disclosure.

Referring to FIG. 10, a UE is in 'RRC_CONNECTED' state. To initiate the RRC connection re-establishment, at operation 1002, a UE transmits a RRC re-establishment request to a gNB. The RRC re-establishment request includes at least one of: a 'UE Identity', a 'Short Message Authentication Code for Integrity/authenticity verification (MAC-I)' and a 're-establish cause'. In the embodiment, the UE verification and the UE context retrieval is not successful. The gNB, at operation 1004, sends a RRC setup message including the 're-establish cause'.

In case, the re-establish cause sent in the RRC re-establishment request and the resume cause in the RRC setup message are same, at operation 1006, the UE follows procedure as specified in 3GPP, TS 38.331.

However, in case the re-establish cause sent in the RRC re-establishment request and the re-establish cause in the RRC setup message are different, at operation 1008, the UE sends a RRC setup complete message to the gNB and includes report on manipulation of the re-establish cause on the air interface.

The UE will perform the following operations upon reception of the RRC setup message:
1> if the RRCSetup is received in response to an RRCReestablishmentRequest; or
1> if the RRCSetup is received in response to an RRCResumeRequest or RRCResumeRequest1:
2> discard any stored UE Inactive AS context and suspendConfig;

2> discard any current AS security context including the $K_{RRCenc}$ key, the $K_{RRCint}$ key, the $K_{UPint}$ key and the $K_{UPenc}$ key;

2> release radio resources for all established RBs except SRB0, including release of the RLC entities, of the associated PDCP entities and of SDAP;

2> release the RRC configuration except for the default MAC Cell Group configuration and CCCH;

2> if the reestablishment cause included in RRCSetup message is different than the reestablishment cause included in RRCReestablishment:

3> indicate the release of the RRC connection to upper layers together with the release cause i.e. security reasons;

2> else indicate to upper layers fallback of the RRC connection;

2> stop timer T380, if running;

1> perform the cell group configuration procedure in accordance with the received masterCellGroup and as specified in 5.3.5.5;

1> perform the radio bearer configuration procedure in accordance with the received radioBearerConfig and as specified in 5.3.5.6;

1> if stored, discard the cell reselection priority information provided by the cellReselectionPriorities or inherited from another RAT;

1> stop timer T300, T301 or T319 if running;

1> if T390 is running:

2> stop timer T390 for all access categories;

2> perform the actions as specified in 5.3.14.4.

1> stop timer T302, if running;

1> stop timer T320, if running;

1> if the RRCSetup is received in response to an RRCResumeRequest or RRCResumeRequest1RRCResumeRequest1 or RRCSetupRequest:

2> enter RRC_CONNECTED;

2> stop the cell re-selection procedure;

1> consider the current cell to be the PCell;

1> set the content of RRCSetupComplete message as follows:

2> if the RRCSetupRequest was triggered by upper layers due to vulnerability of air interface:

3> include the indicator indicating vulnerability of air interface;

3> include the resume cause previously sent in RRCResumeRequest or RRCResumeRequest1 message;

3> include the PCI of the cell, where the RRCResume message received

Figure 11:
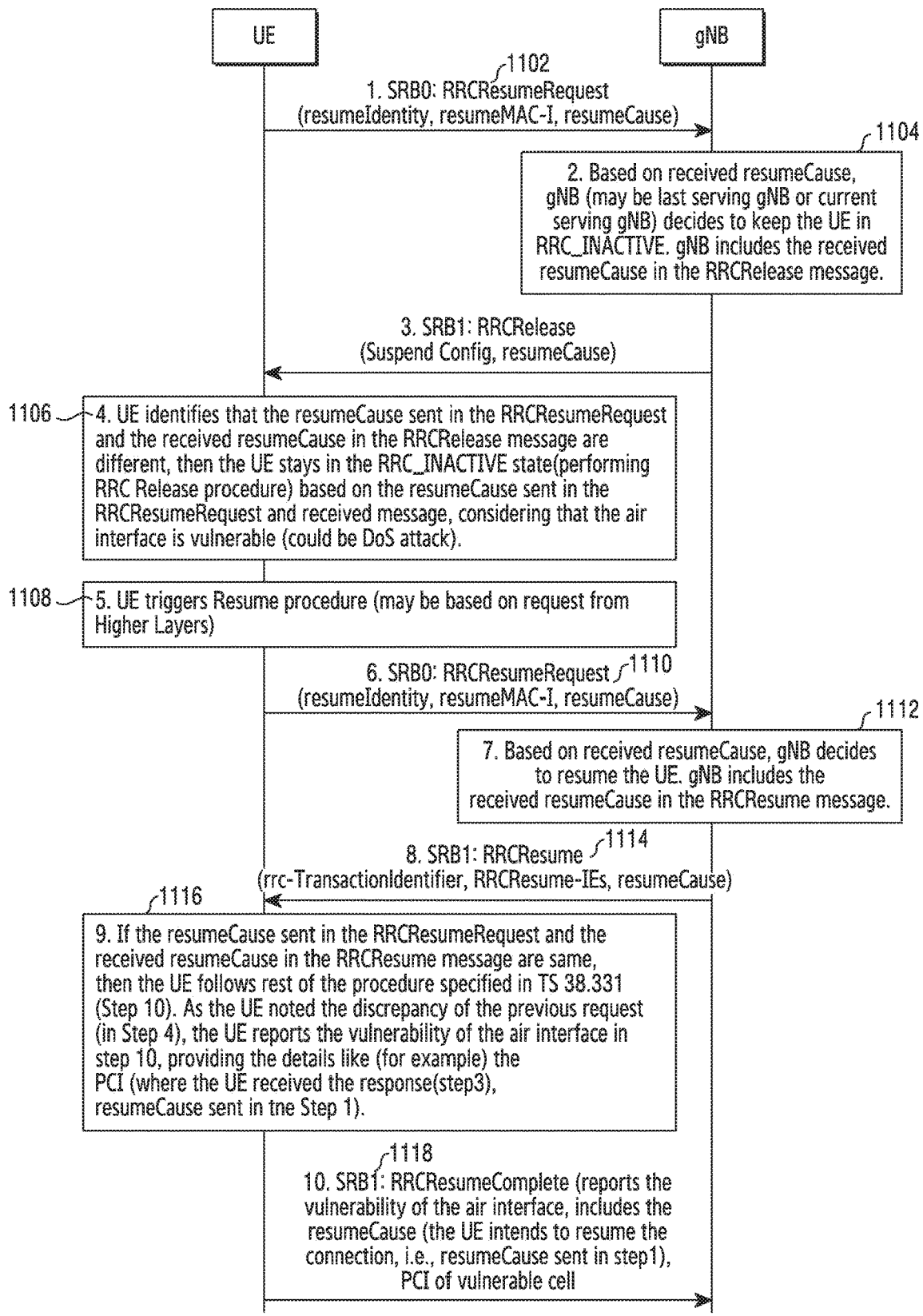
FIG. 11 illustrates a flowchart for a method of reporting manipulation of a RRC signaling message on an protected air interface according to an embodiment of the disclosure.

2> if upper layers provide an 5G-S-TMSI:

3> if the RRCSetup is received in response to an RRCSetupRequest:

4> set the ng-5G-S-TMSI-Value to ng-5G-S-TMSI-Part2;

3> else:

4> set the ng-5G-S-TMSI-Value to ng-5G-S-TMSI;

2> set the selectedPLMN-Identity to the PLMN selected by upper layers (TS 24.501 [23]) from the PLMN(s) included in the plmn-IdentityList in SIB1;

2> if upper layers provide the 'Registered AMF':

3> include and set the registeredAMF as follows:

4> if the PLMN identity of the 'Registered AMF' is different from the PLMN selected by the upper layers:

5> include the plmnIdentity in the registeredAMF and set it to the value of the PLMN identity in the 'Registered AMF' received from upper layers;

4> set the amf-Identifier to the value received from upper layers;

3> include and set the guami-Type to the value provided by the upper layers;

2> if upper layers provide one or more S-NSSAI (see TS 23.003 [21]):

3> include the s-nssai-List and set the content to the values provided by the upper layers;

2> set the dedicatedNAS-Message to include the information received from upper layers;

1> submit the RRCSetupComplete message to lower layers for transmission, upon which the procedure ends FIG. 11 illustrates a flowchart for a method of reporting manipulation of a RRC signaling message on an air interface according to an embodiment of the disclosure.

Referring to FIG. 11, at operation 1102, the UE transmits a RRC resume request message to the gNB. The RRC resume request message includes a 'resume Identity', a 'resume Message Authentication Code for Integrity/authenticity verification (resumeMAC-I)', a 'resume cause' and other possible parameters. At operation 1104, based on the received resume cause, the gNB decides to keep the UE in 'RRC_INACTIVE' state. In this scenario, gNB may be a last serving gNB or a current serving gNB. The gNB includes the 'resume cause' in a RRC release message. The RRC release message is sent to the UE from the gNB. The RRC release message includes at least one of: a 'Suspend Config' and the 'resume cause'. In case, the resume cause sent in the RRC resume request message and the resume cause in the RRC release message are same, at operation 1106, the UE follows RRC procedure as specified in 3GPP, TS 38.331.

However, in case the resume cause sent in the RRC resume request message and the resume cause in the RRC release message are different, at operation 1106, the UE stays in the RRC_INACTIVE state (performing RRC Release procedure) based on the resumeCause sent in the RRCResumeRequest and received RRC signaling message, considering that the air interface vulnerable (could be DoS attack). After some time later, at operation 1108, the UE decides to send a RRC Resume request to the gNB based on the request from higher layers (for example, NAS) or due to mobility, then the UE sends the RRC resume request message to the gNB, at operation 1110. The RRC resume request message includes a 'resume Identity', a 'resume Message Authentication Code for Integrity/authenticity verification (resumeMAC-I)', a 'resume cause' and other possible parameters. At operation 1112, based on the received resume cause, the gNB decides to resume the UE to 'RRC_CONNECTED' state. In this scenario, gNB may be a last serving gNB or a current serving gNB. The gNB includes the 'resume cause' in a RRC resume message. At operation 1114, the RRC resume message is sent to the UE from the gNB. The RRC resume message includes the 'resume cause'. In case, the resume cause sent in the RRC resume request message and the resume cause in the RRC release message are same, at operation 1116, the UE follows RRC procedure as specified in 3GPP TS 38.331. Further, as the UE noted the discrepancy of the previous request (in operation 4), the UE reports the vulnerability of the air interface in operation 8, providing the details like (for example) the PCI (where the UE received the response (operation 3), resumeCause sent in the operation 1). In operation 1118, the UE sends a RRC setup complete message to the gNB and includes the report on manipulation of the resume cause on the air interface. The vulnerability of the air interface report includes (not limited to), the resumeCause (the UE intends to resume the connection, i.e., resumeCause sent in operation 1), PCI of the vulnerable cell).

Figure 12:
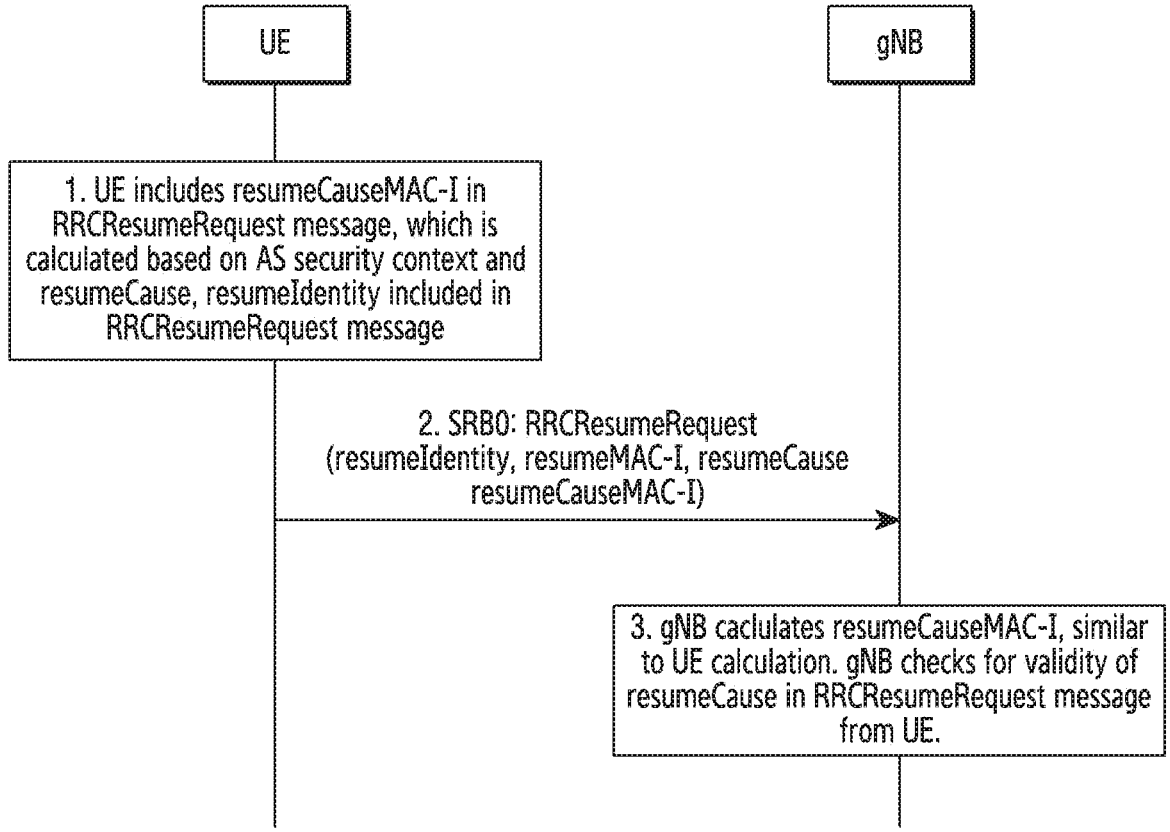
FIG. 12 illustrates a flowchart for a method of network identifying whether a Resume Cause is modified/altered using a UE generated resumeCauseMAC-I according to an embodiment of the disclosure.

FIG. 12 illustrates a flowchart for a method of network identifying whether a Resume Cause is modified/altered using a UE generated resumeCauseMAC-I according to an embodiment of the disclosure.

Referring to FIG. 12, the modification of resumeCause over the air by a rogue UE is identified by using message authentication code (resumeCauseMAC-I) derived based on resumeCause, resumeIdentity and other possible parameters. The resumeCauseMAC-I calculated using the integrity algorithm (NIA) in the stored AS security context, which was negotiated between the UE and the source gNB and the current $K_{RRCint}$ with the following inputs:

KEY: it shall be set to current $K_{RRCint}$;
BEARER: all its bits shall be set to 1.
DIRECTION: its bit shall be set to 1;
COUNT: all its bits shall be set to 1;
MESSAGE: the entire RRCResumeRequest message or alternatively at least one of the following inputs: resumeCause, resumeIdentity, source C-RNTI, source PCI, target Cell-ID, other possible parameters.

Figure 13:
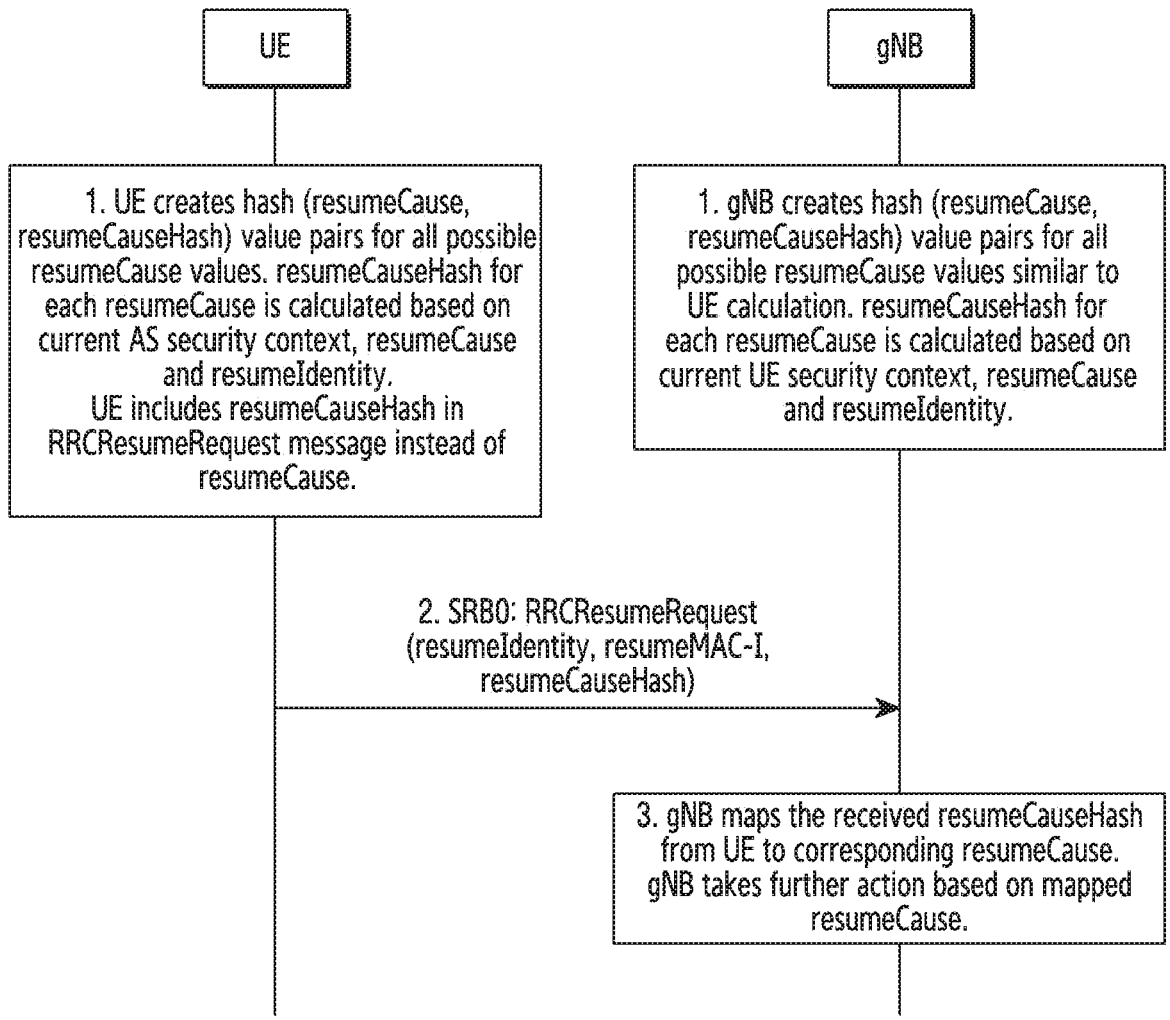
FIG. 13 illustrates a flowchart for a method of identifying a Resume Cause using a hash table derived based on a stored UE's AS security context according to an embodiment of the disclosure.

FIG. 13 illustrates a flowchart for a method of identifying a Resume Cause using a hash table (using digest) derived based on a stored UE's AS security context according to an embodiment of the disclosure.

Referring to FIG. 13, it enables sending only digest of resumeCause in RRCResumeRequest, preventing from changing resumeCause value over air by a rogue UE. The UE and the gNB create a hash value pair (resumeCause, resumeCauseHash) for each possible resumeCause. The resumeCauseHash is calculated using the integrity algorithm (NIA) and current $K_{RRCint}$ key in the stored AS security context, resumeCause, and resumeIdentity.

The disadvantages of including the resume cause in the resumeMAC-I calculation are as follows: attack scenario or requirement in the overload conditions are not addressed. If the attacker modified the resume cause from High-Priority-Access to mo-data, then target does not consider the request and sends Reject with wait timer. In this case, the UE behavior is unspecified and can be abnormal (implementation can hold the emergency call until the wait timer elapses, which is unacceptable from regulator norms). Further, the resume MAC-I is meant to verify the authenticity of the UE and not for message integrity check. In case of modification of the resume cause, it always ends in context retrieval failure procedure, which leads to establish a new RRC connection (RRC Setup procedure).

Furthermore, there is no scope for identification of the attack on the air interface, if too many parameter are included in the MAC-I calculation. And, the attack scope widens, as the attacker can modify any one parameter.

Major disadvantage of including resume cause in the resumeMAC-I calculation is that if there is no manipulation of the resume cause then the UE connection will be resumed even if the NW is congested. Assuming the UE sent RRCResumeRequest message including the resume case as "highpriorityaccess" (HPA) or "mps-PriorityAccess" or "mcs-PriorityAccess". However, if the resume cause is manipulated from "highpriorityaccess" or "mps-PriorityAccess" or "mcs-PriorityAccess" to say "mo-data" and the NW is congested then the target gNB may simply reject the resume request from the UE resulting in temporary denial-of-service. The UE is not aware why the resume request is rejected. Only when the resume cause is echoed back by the target gNB in the Reject message the UE becomes aware that there is a man-in-the-middle attack on the air interface.

Moreover, the manipulation of the contents of the RRCResumeRequest message is not restricted to the resume cause but the attacker can also manipulate the resume identity. If the resume identity is manipulated then the target gNB cannot identify the anchor gNB where the UE context is stored. In such a scenario, the target gNB does a fallback using the RRCsetup message. Even though there is no denial-of-service but expected behavior is manipulated by the attacker by launching such an attack without the knowledge of the NW or UE.

The disclosure addresses the abovementioned disadvantages. For example, using rejectMAC-I, the RRCReject message protection is achieved by calculating and including the reject Message Authentication Code for Integrity/authenticity verification (rejectMAC-I) using the stored UE AS security context in the RRCReject message and transmitted over the SRB0.

In other example, the gNB includes the 'resume cause' in response to resume request message (which is integrity protected) thereby leading to "echoing" of the ResumeCause message. As referred in the description of preceding figures, if resume cause sent and received are determined similar at UE, the UE follows RRC procedure as specified in 3GPP TS 38.331. If the resume causes are different, the UE send a RRC setup request to the gNB considering that the air interface is vulnerable from possible DoS attack. The UE sends a RRC Resume Complete message to transit to RRC_CONNECTED state, and optionally includes the indicator indicating vulnerability of air interface In some embodiments, a method of securing unicast message communication in 3GPP based wireless networks comprising: sending (step 302, 802), by a UE, a request-message for resuming RRC connection to a gNodeB; receiving (step 304, 306, 804, 806) by the UE from the gNodeB an RRC reject message in case of network-rejection to the request, said RRC reject message comprising a first message authentication code computed by the gNodeB based on a stored network security context; mapping (step 308, 808) by the UE at least one of a second message authentication code with the first message authentication code, said second code having been computed by the UE based on the stored network security context; and acknowledging (308, 808) the RRC reject message by the UE based on a successful mapping of the second message authentication code with first message authentication code.

In some embodiments, the method as claimed in claim 1, further comprising: based on a successful mapping, said UE performing (308, 808) RRC procedures through communicating with the gNodeB; in case of unsuccessful-mapping, said UE performing (308, 808) at least one of: sending a network-set up request to the gNodeB for establishing a new RRC connection based on a count of number of unsuccessful mappings exceeding a threshold; and optionally reporting vulnerability in the air-interface defined as denial of service during sending the network-set up request to the gNodeB, said vulnerability defined by alteration of the request message from UE to the gNodeB and thereby directed to deny an intended service requested by the UE from the gNodeB.

In some embodiments, the gNodeB calculates the first message authentication code based on a stored AS security context.

In some embodiments, the gNodeB and the UE calculates the first and second message authentication code based on at least one of: KEY set to current $K_{RRCint}$; BEARER having bits set to 1; DIRECTION having bit set to 1; COUNT having bits set to 1; and MESSAGE set to VarResumeMAC-Input in accordance with a 3GPP standard defined as TS 38.331.

In some embodiments, said MESSAGE comprises at least one of: the entire RRCResumeRequest message, resumeCause, resumeIdentity, waitTime (RejectWaitTime), source C-RNTI, source PCI, target Cell-ID, other possible parameters.

In some embodiments, the first message authentication code is calculated by a source gNodeB holding the UE's security context.

In some embodiments, a method of securing unicast message communication in 3GPP based wireless networks comprising: sending (step 102, 202, 402), by a UE, a request-message for resuming RRC connection to a gNodeB, said request message comprising a first parameter defining "resume cause"; receiving (step 104, 106, 204, 206, 404, 406) by the UE from the gNodeB a response pertaining at least one of network-release or network resumption, said response comprising a second parameter defining "resume cause"; mapping (step 108, 208, 408) by the UE the first parameter present within the request message and the second parameter present within the response; and acknowledging (step 108, 208, 408) the response from the gNodeB by the UE based on a successful mapping of the second parameter with first parameter.

In some embodiments, the first parameter defining resume cause in the RRC request message is defined by at least one of: emergency services, RNA update service and MoData services.

In some embodiments, the method further comprising: based on a successful mapping and the received response, said UE performing the RRC procedures through communicating with the gNodeB; in case of unsuccessful mapping, said UE performing at least one of: sending a network-set up request to the gNodeB for establishing a new RRC connection based on a count of number of unsuccessful mappings exceeding a threshold; and optionally reporting vulnerability in the air-interface defined as denial of service during sending the network-set up request to the gNodeB, said vulnerability defined by alteration of the request message from UE to the gNodeB and thereby directed to deny an intended service requested by the UE from the gNodeB.

In some embodiments, the UE reports the network attack by reporting vulnerability of air interface through communicating: the first parameter defining the "resume cause"; and a PCI of a cell associated with the gNodeB sending the response with the second parameter that is different than expected "resume cause".

In some embodiments, a UE operating in 3GPP based wireless networks for securing unicast message communication, said UE comprising: a transceiver (Tx/Rx) configured for: sending a request-message for resuming RRC connection to a gNodeB; and receiving from the gNodeB an RRC reject message in case of network-rejection to the request, said RRC reject message comprising a first message authentication code computed by the gNodeB based on a stored network security context; and a processing module (1400) configured for mapping by the UE at least one of a second message authentication code with the first message authentication code, said second code having been computed by the UE based on the stored network security context; and acknowledging the RRC reject message based on a successful mapping of the second message authentication code with first message authentication code.

In some embodiments, a UE operating in 3GPP based wireless networks for securing unicast message communication, said UE comprising: a transceiver (Tx/Rx) for: sending a request-message for resuming RRC connection to a gNodeB, said request message comprising a first parameter defining "resume cause"; and receiving from the base station a response pertaining at least one of network-release or network resumption, said response comprising a second parameter defining "resume cause"; a processing module (1400) for: mapping the first parameter present within the request message and the second parameter present within the response; and acknowledging the response from the gNodeB based on a successful mapping of the second message authentication code with first message authentication code.

In some embodiments, a gNodeB operating in 3GPP based wireless networks for securing unicast message communication, said gNodeB comprising: a transceiver (Tx/Rx) for receiving a request-message for resuming RRC connection from a UE, said request message comprising a first-parameter defining "resume cause"; and a processing module (1400) configured for at-least one of: generating, for the UE, a response pertaining at least one of network-release or network resumption, said response comprising a second parameter defining "resume cause"; and sending an RRC reject message comprising a first message authentication code to the UE message in case of network-rejection to the request, said first message authentication code having been computed based on a stored network security context.

Figure 14A:
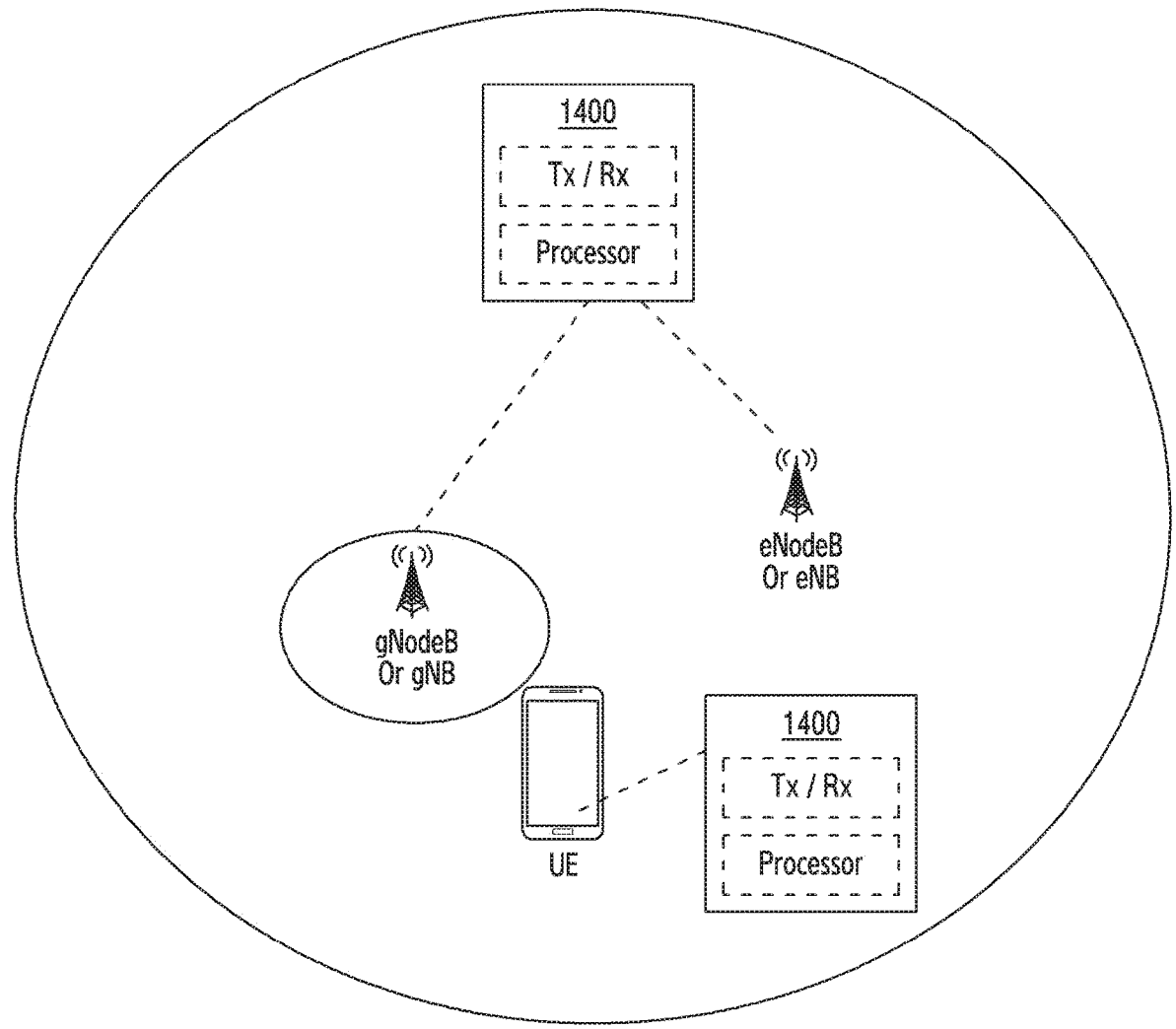
FIGS. 14A and 14B illustrate an example implementation in a networking environment and a computing-device based implementation according to various embodiments of the disclosure.
Figure 14B:
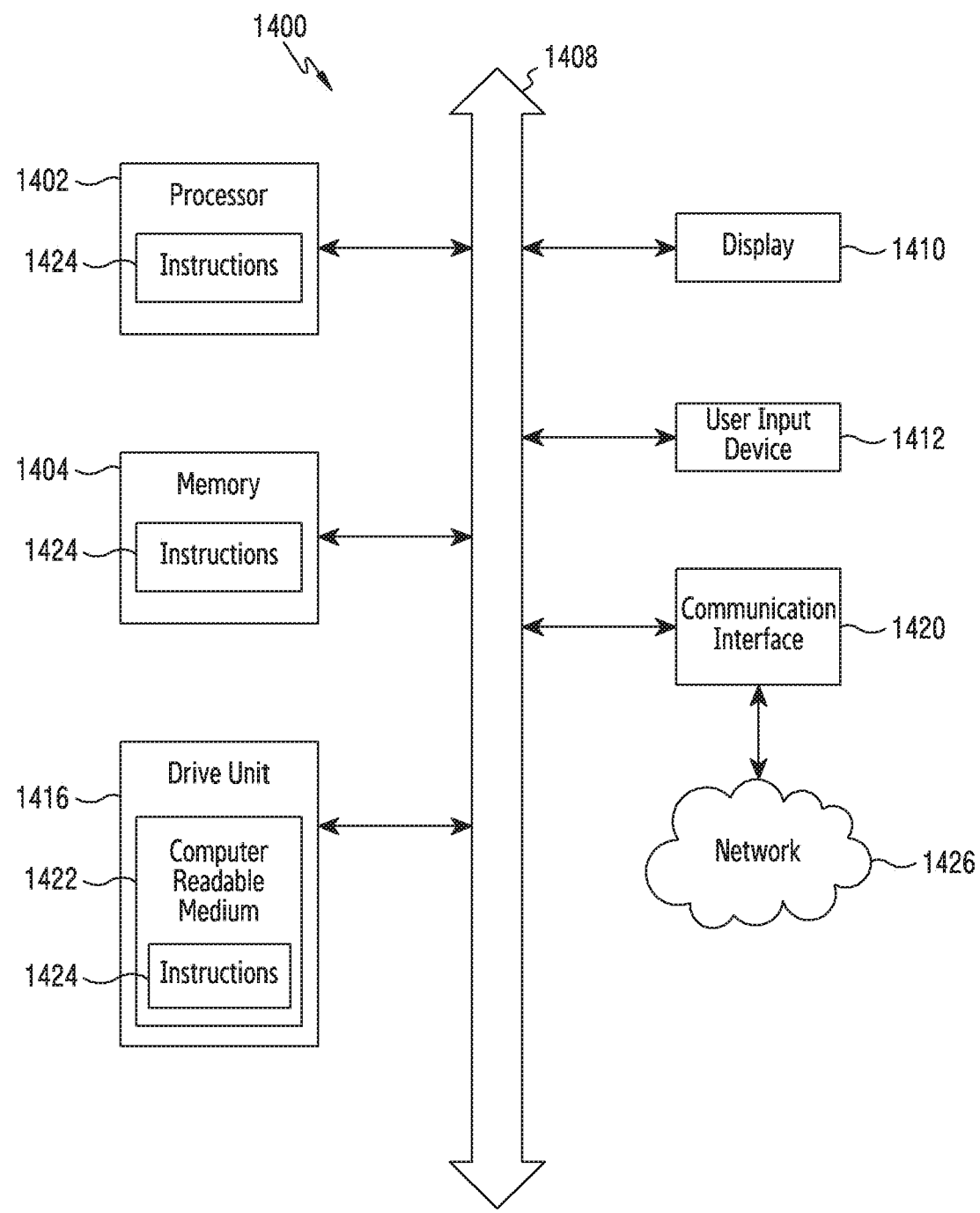

FIGS. 14A and 14B illustrate an example implementation in a networking environment and a computing-device based implementation according to various embodiments of the disclosure.

Referring to FIG. 14A, the above-mentioned features of the present disclosure can be executed by a computing-system 1400 residing in UE, eNodeB, gNodeB. Each of the UE, eNodeB, gNodeB also comprises a transceiver (Tx/Rx).

Referring to FIG. 14B, a typical hardware configuration a computer-system 1400 present within each of UE, eNodeB, and gNodeB is illustrated. The computer system 1400 can include a set of instructions that can be executed to cause the computer system 1400 to perform any one or more of the methods disclosed. The computer system 1400 may operate as a standalone-device or may be connected, e.g., using a network, to other computer systems or peripheral devices.

In a networked deployment, the computer system 1400 may operate in the capacity of a server or as a client user computer in a server-client user network environment, or as a peer computer system in a peer-to-peer (or distributed) network environment. The computer system 1400 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

The computer system 1400 may include a processor 1402 e.g., a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analysing and processing data. The processor 1402 may implement a software program, such as code generated manually (i.e., programmed).

The computer system 1400 may include a memory 1404, such as a memory 1404 that can communicate via a bus 1408. The memory 1404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1404 includes a cache or random access memory for the processor 1402. In alternative examples, the memory 1404 is separate from the processor 1402, such as a cache memory of a processor, the system memory, or other memory. The memory 1404 may be an external storage device or database for storing data. The memory 1404 is operable to store instructions executable by the processor 1402. The functions, acts or tasks illustrated in the figures or described may be performed by the programmed processor 1402 for executing the instructions stored in the memory 1404. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1400 may or may not further include a display 1410, such as a liquid crystal display (LCD), an organic light emitting diode (OLED), a flat panel display, a solid state display for outputting determined information. The display 1410 may act as an interface for the user to see the functioning of the processor 1402, or specifically as an interface with the software stored in the memory 1404 or in the drive unit 1416.

Additionally, the computer system 1400 may include an input device 1412 configured to allow a user to interact with any of the components of system 1400. The computer system 1400 may also include a disk or optical drive unit 1416. The disk drive unit 1416 may include a computer-readable medium 1422 in which one or more sets of instructions 1424, e.g. software, can be embedded. Further, the instructions 1424 may embody one or more of the methods or logic as described. In a particular example, the instructions 1424 may reside completely, or at least partially, within the memory 1404 or within the processor 1402 during execution by the computer system 1400.

The disclosure contemplates a computer-readable medium that includes instructions 1424 or receives and executes instructions 1424 responsive to a propagated signal so that a device connected to a network 1426 can communicate voice, video, audio, images or any other data over the network 1426. Further, the instructions 1424 may be transmitted or received over the network 1426 via a communication port or interface 1420 or using a bus 1408. The communication port or interface 1420 may be a part of the processor 1402 or may be a separate component. The communication port 1420 may be created in software or may be a physical connection in hardware. The communication port 1420 may be configured to connect with a network 1426, external media, the display 1410, or any other components in system 1400, or combinations thereof. The connection with the network 1426 may be a physical connection, such as a wired Ethernet connection or may be established wirelessly as discussed later. Likewise, the additional connections with other components of the system 1400 may be physical connections or may be established wirelessly. The network 1426 may alternatively be directly connected to the bus 1408.

The network 1426 may include wired networks, wireless networks, Ethernet AVB networks, or combinations thereof. The wireless network may be a cellular telephone network, an 802.11, 802.16, 802.20, 802.1Q or WiMax network. Further, the network 1426 may be a public network, such as the Internet, a private network, such as an intranet, or combinations thereof, and may utilize a variety of networking protocols now available or later developed including, but not limited to transmission control protocol (TCP)/internet protocol (IP) based networking protocols. The system is not limited to operation with any particular standards and protocols. For example, standards for Internet and other packet switched network transmission (e.g., TCP/IP, user datagram protocol (UDP)/IP, hypertext markup language (HTML), hypertext transfer protocol (HTTP)) may be used.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication, the method comprising:
   sending, by the UE, a request message for resuming radio resource control (RRC) connection to a gNodeB;
   receiving, by the UE, an RRC reject message from the gNodeB in case of a network rejection to the request message, the RRC reject message comprising a first message authentication code computed by the gNodeB based on a stored network security context;
   mapping, by the UE, at least one of a second message authentication code with the first message authentication code, the second message authentication code having been computed by the UE based on the stored network security context; and acknowledging the RRC reject message by the UE based on a successful mapping of the second message authentication code with the first message authentication code.

2. The method of claim 1, further comprising:
in case of unsuccessful mapping, performing at least one of:
sending a network setup request to the gNodeB for establishing another RRC connection based on a count of number of unsuccessful mappings exceeding a threshold; and
reporting vulnerability of an air-interface during sending the network setup request to the gNodeB, wherein the vulnerability comprises alteration of the request message to deny a service requested by the UE from the gNodeB.

3. The method of claim 1, wherein the gNodeB calculates the first message authentication code based on a stored security context.

4. The method of claim 3, wherein the gNodeB and the UE calculates the first message authentication code and the second message authentication code based on at least one of:
a key field set to current KRRCint;
a bearer field having bits set to 1;
a direction field having bit set to 1;
a count field having bits set to 1; and
a message field set to VarResumeMAC-Input in accordance with 3GPP standard TS 38.331.

5. The method of claim 4, wherein the message field comprises at least one of: an entire RRCResumeRequest message, a resumeCause, a resumeIdentity, a waitTime, a source cell radio network temporary identifier (C-RNTI), a source physical cell identifier (PCI), and a target cell identifier.

6. The method of claim 5, wherein the first message authentication code is calculated by a source gNodeB holding the UE's security context.

7. A method performed by a user equipment (UE) in a wireless communication, the method comprising:
sending, by the UE, a request message to a gNodeB for resuming a radio resource control (RRC) connection, the request message comprising a first parameter indicating a resume cause;
receiving, by the UE, a response from the gNodeB pertaining to at least one of a network release or a network resumption, the response comprising a second parameter indicating a resume cause;
mapping, by the UE, the first parameter and the second parameter; and
acknowledging, by the UE, the response from the gNodeB on a successful mapping of the second parameter with the first parameter.

8. The method of claim 7, wherein the first parameter comprises at least one of: emergency services, RNA update service and MoData services.

9. The method of claim 7, further comprising:
in case of an unsuccessful mapping, performing at least one of:
sending a network setup request to the gNodeB for establishing another RRC connection based on a count of number of unsuccessful mappings exceeding a threshold; and
reporting a vulnerability of an air-interface during sending of the network setup request to the gNodeB, wherein the vulnerability comprises alteration of the request message to deny a service requested by the UE from the gNodeB.

10. The method of claim 9, wherein a message for reporting the vulnerability comprises the first parameter, and a physical cell identifier (PCI) of a cell associated with the gNodeB and the second parameter that is different than an expected resume cause.

11. A user equipment (UE) in a wireless communication, the UE comprising:
a transceiver configured to:
send a request message for resuming radio resource control (RRC) connection to a gNodeB, and
receive, from the gNodeB, a radio resource control (RRC) reject message in case of network rejection to the request, the RRC reject message comprising a first message authentication code computed by the gNodeB based on a stored network security context; and
a processor configured to:
compute a second message authentication code based on the stored network security context,
map at least one of the second message authentication code with the first message authentication code, and
acknowledge the RRC reject message based on a successful mapping of the second message authentication code with the first message authentication code.

12. A user equipment (UE) in a wireless communication, the UE comprising:
a transceiver configured to:
send a request message for resuming radio resource control (RRC) connection to a gNodeB, the request message comprising a first parameter indicating a resume cause; and
receive, from the gNodeB, a response pertaining at least one of a network release or a network resumption, the response comprising a second parameter indicating a resume cause; and
a processor configured to:
map the first parameter in the request message and the second parameter present in the response, and
acknowledge the response from the gNodeB based on a successful mapping of a second message authentication code with first message authentication code.

13. A gNodeB in a wireless communication, the gNodeB comprising:
a transceiver configured to receive a request message for resuming a radio resource control (RRC) connection from a user equipment (UE), the request message comprising a first parameter indicating a resume cause; and
a processor configured to at least one of:
generate, for the UE, a response pertaining at least one of a network rejection or a network resumption, the response comprising a second parameter defining a resume cause; and
send an RRC reject message to the UE, the RRC reject message comprising a first message authentication code in case of the network rejection to the request message, and the first message authentication code having been computed based on a stored network security context.

14. The gNodeB of claim 13, wherein the transceiver is further configured to:
after sending the RRC reject message to the UE, receive a network setup request, and
receive a vulnerability report from the UE based on a connection associated with the network setup request, the vulnerability report including the first parameter.

15. The gNodeB of claim 13,
wherein the transceiver is further configured to, after sending the RRC reject message to the UE, receive a second request message for resuming the RRC connection from the UE, and
wherein the processor is further configured to:
   determine to resume the UE based on the second request message, and
   send a resume message to the UE to resume a connection, the resume message including the first parameter.

\* \* \* \* \*